(12) United States Patent
Watanabe

(10) Patent No.: US 7,046,402 B2
(45) Date of Patent: May 16, 2006

(54) IMAGE READING APPARATUS AND IMAGE FORMING APPARATUS

(75) Inventor: Koichi Watanabe, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 913 days.

(21) Appl. No.: 09/984,772

(22) Filed: Oct. 31, 2001

(65) Prior Publication Data

US 2003/0081265 A1    May 1, 2003

(51) Int. Cl.
H04N 1/46 (2006.01)
H04N 1/04 (2006.01)
H04N 1/00 (2006.01)

(52) U.S. Cl. .............. 358/514; 358/505; 358/501; 358/483; 358/496; 358/497; 358/498; 358/401

(58) Field of Classification Search ........ 358/512–514, 358/496, 498, 515, 505, 506, 509, 524, 523, 358/483, 482, 474, 497, 494, 487, 521, 1.5, 358/1.2, 1.16, 401, 501; 250/208.1, 234–236; 382/318, 319, 312, 317

See application file for complete search history.

(56) References Cited

U.S. PATENT DOCUMENTS

| | | | | |
|---|---|---|---|---|
| 5,053,808 A | * | 10/1991 | Takagi | 355/38 |
| 5,175,635 A | * | 12/1992 | Yamada et al. | 358/2.1 |
| 5,583,667 A | * | 12/1996 | Yamada | 358/529 |
| 5,721,628 A | * | 2/1998 | Takaragi et al. | 358/518 |
| 5,894,356 A | * | 4/1999 | Yoo | 358/515 |
| 5,973,802 A | * | 10/1999 | Hirota et al. | 358/521 |
| 6,594,039 B1 | * | 7/2003 | Kanbayashi | 358/491 |
| 6,765,703 B1 | * | 7/2004 | Watanabe | 358/514 |
| 6,804,033 B1 | * | 10/2004 | Hara | 358/522 |
| 6,831,761 B1 | * | 12/2004 | Cardot et al. | 358/505 |
| 6,859,637 B1 | * | 2/2005 | Kawai | 399/367 |

FOREIGN PATENT DOCUMENTS

JP    8-88766    4/1996
JP    2000-307821    11/2000

* cited by examiner

Primary Examiner—Cheukfan Lee
(74) Attorney, Agent, or Firm—Foley & Lardner LLP

(57) ABSTRACT

There is disclosed an image forming apparatus in a black-and-white and/or color automatic judgment copy mode, wherein a draft is main-scanned with black-and-white and stored in a page memory during sheet through reading, and is simultaneously pre-scanned with color, black-and-white image data stored in the page memory is printed for a black-and-white draft, and a color draft is main-scanned with color by flat bed reading and a color printing is performed.

25 Claims, 15 Drawing Sheets

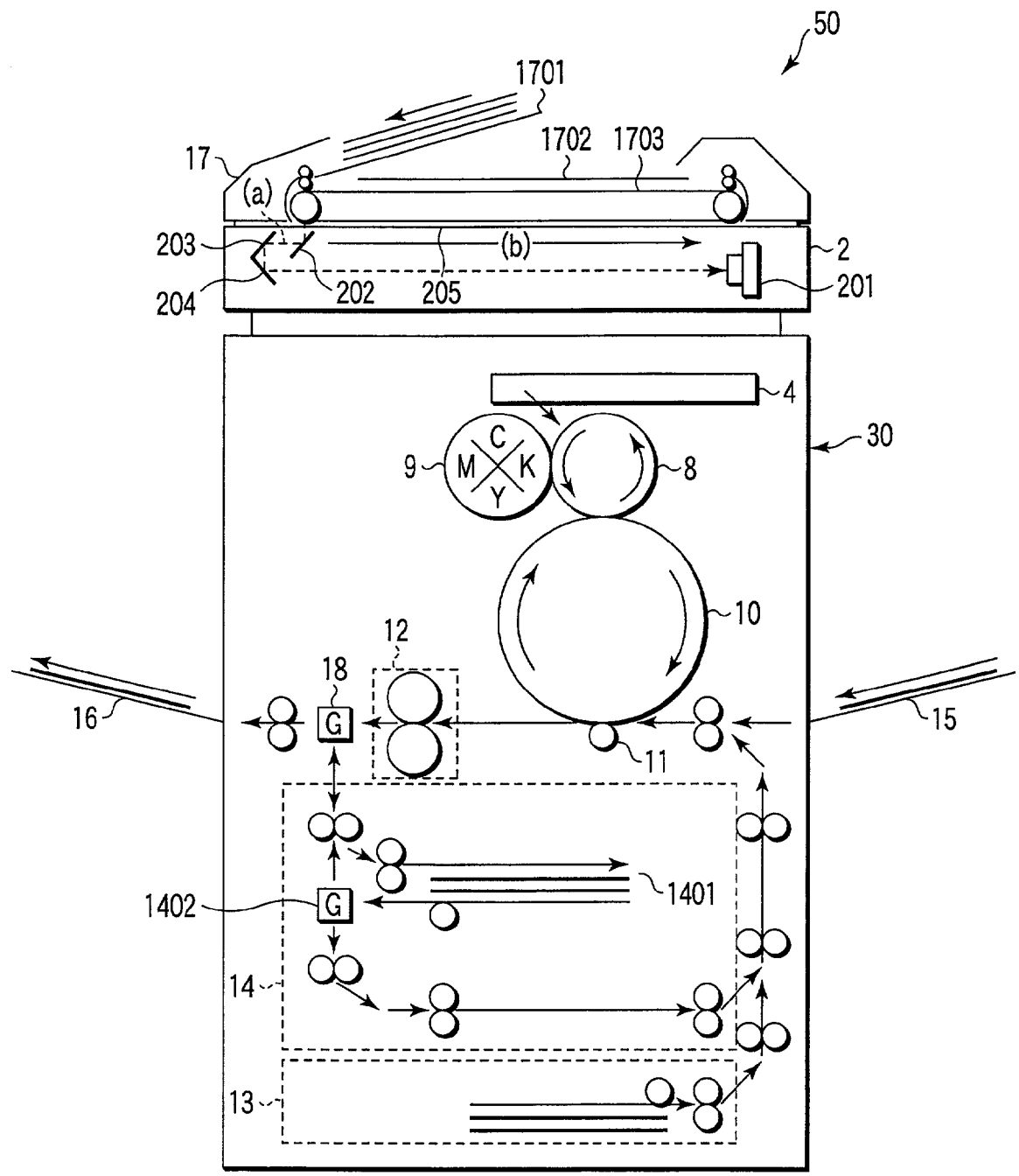
F I G. 2

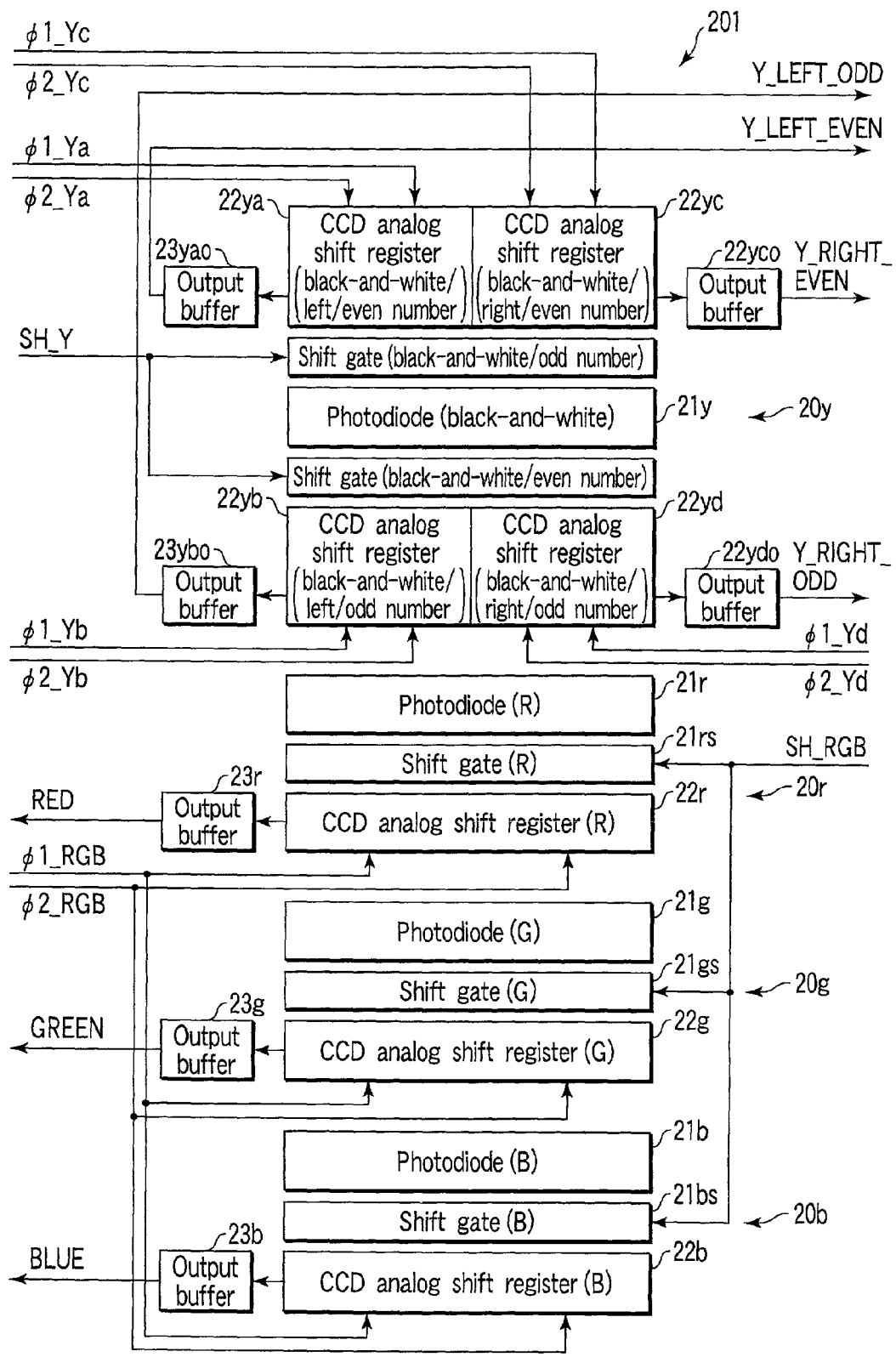
F I G. 4

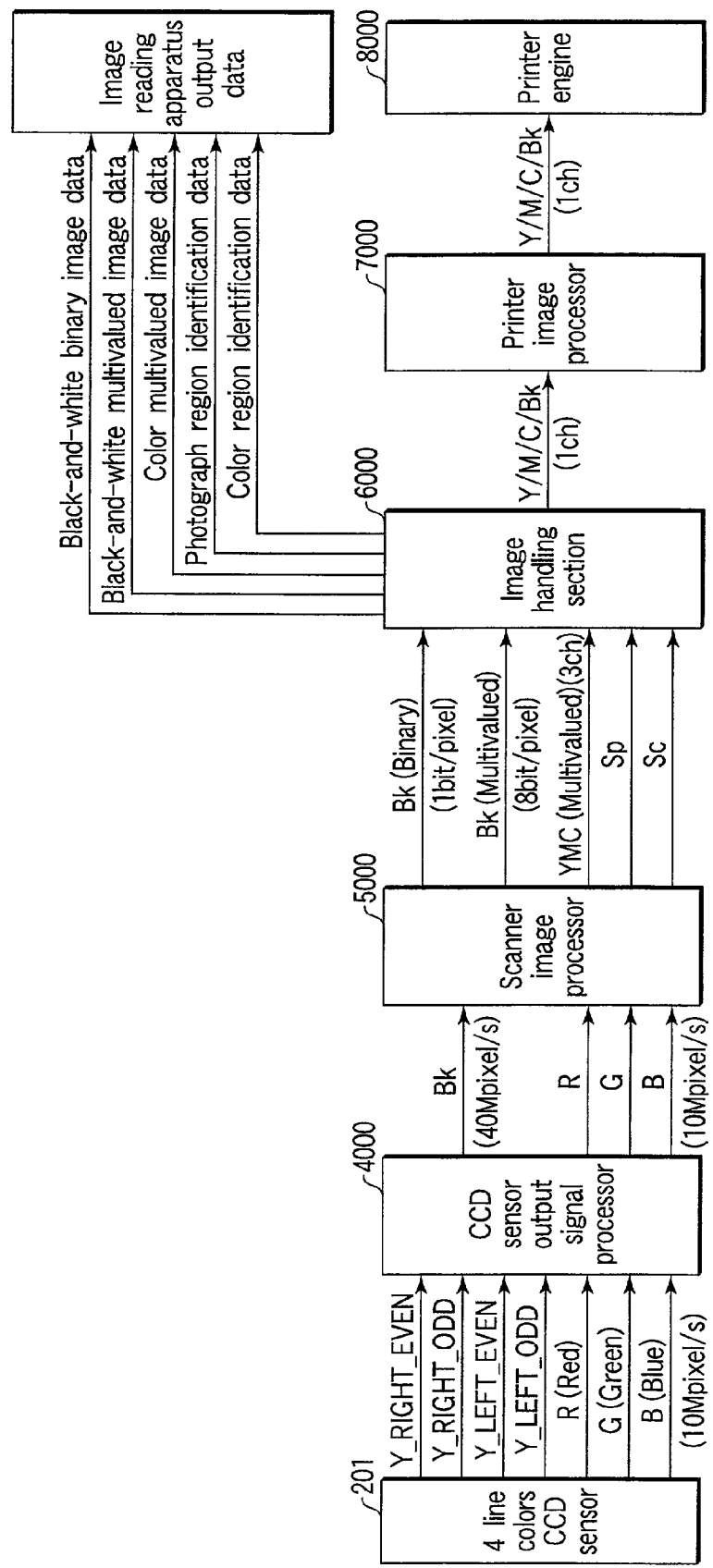
F I G. 5

IMAGE READING APPARATUS AND IMAGE FORMING APPARATUS

BACKGROUND OF THE INVENTION

The present invention relates to image reading apparatuses such as a scanner for optically reading a draft, and image forming apparatuses such as a digital copying machine for forming an image of the draft read by the image reading apparatus.

In a conventional image forming apparatus, a copied image of a draft with a plurality of types of images intermingled therein has been outputted by a plurality of scanning operations.

On the other hand, in Jpn. Pat. Appln. KOKAI Publication No. 8-88766, various types of information on an image type and image position information are acquired during a forward scanning operation, and an image processing suitable for each image type is performed based on the information during a return scanning operation.

Moreover, in Jpn. Pat. Appln. KOKAI Publication No. 2000-307821, a constitution is disclosed in which a three line colors CCD sensor is used, and which has a sheet through system for reading a draft being conveyed and a flat bed system for reading the draft laid on a draft bed. For a black-and-white image, image data (R signal, G signal, and B signal for three lines are synthesized) read by the sheet through system is outputted. For a color image, the same draft is subsequently laid on the draft bed and image data (R, G, B signals) read by the flat bed system is outputted.

The sheet through system is suitable for high-speed reading, because the draft can continuously be fed into a reading section at a high speed. However, the system is not suitable for reading of the color draft because it is difficult to control conveyance of the draft at a high precision.

Moreover, the flat bed system is not suitable for high-speed reading, because it is necessary to move the reading section having a considerable weight. However, the system is suitable for the reading of the color draft, because it is easy to control movement at a high precision.

However, when the black-and-white image is read by the sheet through system, the R, G, and B signals are synthesized. There is therefore a problem that a signal error is generated, an image quality is deteriorated, and high-precision and high-speed reading cannot be performed.

Furthermore, there is a demand for realization of the high-speed reading even with a draft in which a plurality of types of images are intermingled.

BRIEF SUMMARY OF THE INVENTION

An object of the present invention is to provide an image reading apparatus in which a signal error of sheet through reading is removed and a higher-speed reading can be achieved at a high image quality, and to provide an image forming apparatus which has the image reading apparatus and forms an image.

To achieve the aforementioned object, according to the present invention, there is provided an image forming apparatus which has an automatic draft feeder for feeding a draft to a draft reading base and which reads an image of the draft and forms the image, the apparatus comprising: an image reading section including a first line CCD sensor for reading the draft as a black-and-white image, and second, third, and fourth line CCD sensors for reading the draft as a color image; a first controller for controlling and using the image reading section to read an entire surface of the draft by movement of the draft, when the automatic draft feeder feeds the draft to the draft reading base; a storage section for storing black-and-white image data read by the first line CCD sensor under control by the first controller; a judgment section for judging whether or not the draft is a black-and-white draft from color image data read by the second, third, and fourth line CCD sensors under control by the first controller; and a second controller for controlling and moving a reading position of the image reading section and reading the entire surface of the draft fed onto the draft reading base, when the judgment section judges the draft not to be the black-and-white draft, wherein the black-and-white image is formed based on the image data stored in the storage section, when the judgment section judges the draft to be the black-and-white draft, and the color image is formed based on the color image data read by the second, third, and fourth line CCD sensors under control by the second controller, when the judgment section judges the draft not to be the black-and-white draft.

According to the present invention, there is provided an image reading apparatus which has an automatic draft feeder for feeding a draft to a draft reading base and which reads an image of the draft, the apparatus comprising: an image reading section including a first line CCD sensor for reading the draft as a black-and-white image, and second, third, and fourth line CCD sensors for reading the draft as a color image; a first controller for controlling and using the image reading section to read an entire surface of the draft by movement of the draft, when the automatic draft feeder feeds the draft to the draft reading base; a first storage section for storing black-and-white image data read by the first line CCD sensor under control by the first controller; a region identification section for judging whether or not each region of the draft is achromatic based on color image data read by the second, third, and fourth line CCD sensors controlled by the first controller; a second storage section for storing an identification result of the region identification section; a judgment section for totaling the identification result of the region identification section by a page unit and judging whether or not the draft is a black-and-white draft; and a second controller for controlling and moving a reading position of the image reading section and reading the entire surface of the draft fed onto the draft reading base, when the judgment section judges the draft not to be the black-and-white draft, wherein the image data stored in the first storage section is outputted, when the judgment section judges the draft to be the black-and-white draft, and the black-and-white image data read by the first line CCD sensor under control by the second controller is outputted in an achromatic region, and the color image data read by the second, third, and fourth line CCD sensors under control by the second controller is outputted in a non-achromatic region as the identification result of the draft stored in the second storage section, when the judgment section judges the draft not to be the black-and-white draft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view schematically showing an internal constitution of an image forming apparatus;

FIG. 4 is a diagram showing a transmission path of an image signal of the four line colors CCD sensor;

FIG. 5 is a diagram showing a constitution of a data processing block of the image reading apparatus in which the four line colors CCD sensor is used;

DETAILED DESCRIPTION OF THE INVENTION

One embodiment of the present invention will be described hereinafter with reference to the drawings.

Figure 1:
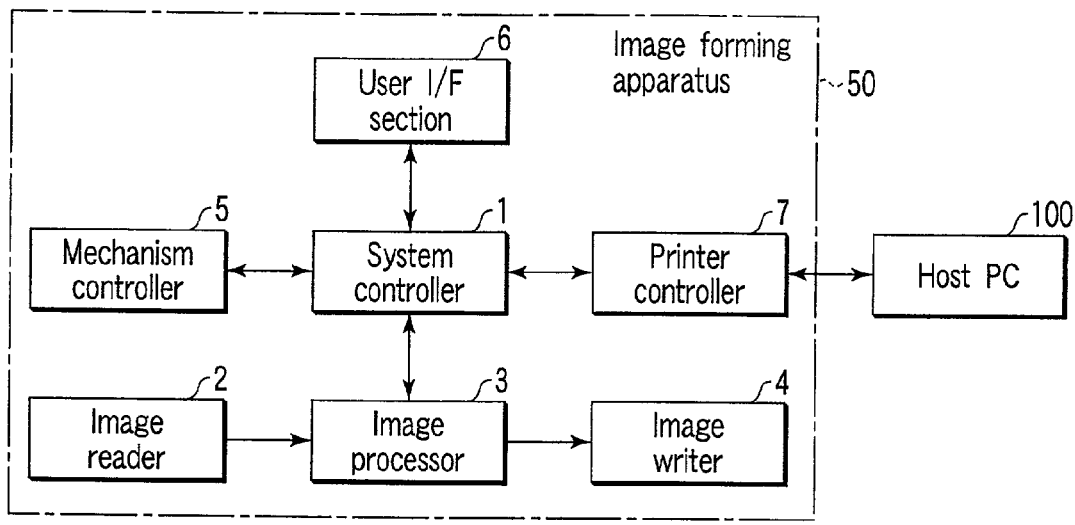
FIG. 1 is a block diagram showing a schematic constitution of a system according to the present invention.

FIG. 1 shows a schematic constitution of a system according to the present invention.

That is, the system is constituted of an image forming apparatus 50 and a host personal computer (PC) 100 which issues a printing command as occasion demands.

The image forming apparatus 50 is constituted of a system controller 1, image reader 2, image processor 3, image writer 4, mechanism controller 5, user I/F section 6, and printer controller 7.

The system controller 1 controls the whole system.

The image reader 2 is a scanner in which a draft is irradiated with a color source, and scanned, and an image is read from a reflected light from the draft by a four line colors CCD sensor described later.

The image processor 3 subjects image data read by the image reader 2 to processings such as γ correction, color conversion, variable power main scanning, image separation, working, area processing, and gradation correction processing.

The image writer 4 modulates driving of a laser diode described later in accordance with the image data from the image processor 3.

The mechanism controller 5 controls a mechanism of each unit constituting the present apparatus.

In the user I/F section 6, a user inputs an operation setting of the present apparatus and displays a setting screen.

The printer controller 7 converts a printing command from the host PC 100 to printable image data, when the present apparatus is used as a color printer. Additionally, the printer controller 7 can be an option, when the apparatus is not used as the color printer.

FIG. 2 schematically shows an internal constitution of the image forming apparatus 50. The image forming apparatus 50 is constituted of the image reader 2 as the scanner, and a printer section 30 which has the image writer 4.

A draft laying base (draft reading base) 205 formed of transparent glass with a reading object, that is, the draft laid thereon is disposed on a top surface of the image reader 2. Moreover, an automatic draft feeder (ADF) 17 for automatically feeding the draft onto the draft laying base 205 is disposed on the top surface of the image reader 2. The automatic draft feeder 17 is disposed to be openable/closable with respect to the draft laying base 205, and also serves as a draft presser which brings the draft laid on the draft laying base 205 in close contact with the draft laying base 205.

The image reader 2 is constituted of: a four line colors CCD sensor 201 for reading the draft image with respect to red (R), green (G), blue (B), and black-and-white (Y) by a unit of one line; a first mirror 202 for guiding a line image on the draft to the four line colors CCD sensor 201; a second mirror 203; a third mirror 204; the draft laying base 205; and a light source (omitted from the drawing), disposed in the vicinity of the first mirror, for obtaining a reflected light of a reading line of the draft.

The printer 30 is constituted of: the image writer 4 having a laser diode (LD) 4a; a photosensitive drum 8; a developing section 9 for attaching respective color toners to the image and visualizing the image; an intermediate transfer section 10 for re-transferring the image formed on the photosensitive drum 8 onto a transfer belt; a transfer section 11 for transferring the image formed on the photosensitive drum 8 to a transfer sheet; a fixing section 12 which has a fixing roller and a pressurizing roller and thermally fixes the image; a sheet supply section 13 for supplying the transfer sheet; a FIFO automatic double-surface unit (ADU) 14; a manual sheet supply section 15; a sheet discharge section 16; and a conveyance path switching gate 18.

The automatic draft feeder 17 is constituted of a draft laying base 1701, a draft discharge base 1702, and a draft feeding belt 1703. The draft is set on the draft laying base 1701, and the draft on the draft laying base 1701 is automatically supplied and discharged by the draft feeding belt 1703. During sheet discharge, the draft is discharged to the draft discharge base 1702.

An image forming operation of the image forming apparatus 50 in the aforementioned constitution will next be described with reference to FIGS. 1 and 2.

The system controller 1 controls the whole image forming apparatus 50.

First in the image reader 2, the draft is irradiated with the light source (not shown) and scanned, the reflected light from the draft is received by the four line colors CCD sensor 201, and image data of the draft is transmitted to the image processor 3.

The image processor 3 subjects the transmitted image data to image processings such as γ correction, color conversion, variable power main scanning, image separation, working, area processing, and gradation correction processing, and transmits the data to the image writer 4.

The image writer 4 drives the LD 4a and modulates the LD 4a in accordance with the transmitted image data.

After the photosensitive drum 8 is uniformly charged, a latent image is written by a laser beam from the LD 4a, the toner is attached to the image, and the image is visualized by the developing section 9.

The image formed on the photosensitive drum 8 is re-transferred onto an intermediate transfer belt of the intermediate transfer section 10. With a full-color copy, four-color (black, cyan, magenta, yellow) toners are successively superposed onto the intermediate transfer belt of the intermediate transfer section 10.

With a full color, when a process for forming and transferring a four-color image ends, a sheet is supplied from the sheet supply section 13 (or the manual sheet supply tray 15) at a timing matched with a timing of the intermediate transfer belt of the intermediate transfer section 10, and four color toners are simultaneously transferred to the sheet from the intermediate transfer belt of the intermediate transfer section 10 in the transfer section 11.

With a single-color copy, one-color (black) toner is transferred onto the transfer belt from the photosensitive drum 8. Similarly as the full color, when the process for forming and transferring the image ends, the sheet is supplied from the sheet supply section 13 (or the manual sheet supply tray 15) at the timing matched with the timing of the intermediate transfer belt of the intermediate transfer section 10, and the toner is transferred to the sheet from the intermediate transfer belt of the intermediate transfer section 10 in the transfer section 11.

The transfer sheet with the toner transferred thereto is fed to the fixing section 12 via a conveyance path, thermally fixed by the fixing roller and pressurizing roller, and discharged to the sheet discharge section 16.

Moreover, a setting of a copy mode or the like by the user is inputted from the user I/F section 6. Set operation modes such as the copy mode are transmitted to the system controller 1.

The system controller 1 performs a control processing in order to execute the set copy mode. In this case, the system controller 1 transmits a control instruction to the image reader 2, image processor 3, image writer 4, user I/F section 6, printer controller 7, mechanism controller 5, and the like. Furthermore, the system controller 1 also transmits the control instruction to respective units such as the FIFO automatic double-surface unit 14 and automatic draft feeder 17 as shown in FIG. 1.

An operation of the FIFO automatic double-surface unit (hereinafter referred to as ADU) 14 will next be described with reference to FIG. 1. The ADU 14 in the present apparatus has the following three functions.

In a first function, a back/front of the sheet is reversed so that the sheet with a fixed and printed surface facing upwards (hereinafter referred to as face-up) is discharged with the printed surface facing downwards (hereinafter referred to as face-down).

That is, the transfer sheet fixed by the fixing section 12 is conveyed to an ADU 14 side by the conveyance path switching gate 18. Immediately after a sheet rear end passes the conveyance path switching gate 18, a conveyance direction is reversed, and the sheet is discharged to the sheet discharge section 16. In this case, the transfer sheet is not stacked on a FIFO stack 1401. When the draft is successively treated in order from a first page, the face-down sheet discharge is necessary in order to match the printed surface (transferred surface) of the transfer sheet and an output order.

In a second function, the fixed and printed surface of the sheet is reversed, and the sheet is stacked in the ADU 14, extracted in a stacked order at an appropriate sheet discharge timing, and face-down discharged.

That is, the sheet fixed by the fixing section 12 is conveyed to the ADU 14 side by the conveyance path switching gate 18, and stacked on the FIFO stack 1401. At the appropriate sheet discharge timing, the transfer sheet is extracted from the FIFO stack 1401 in the stacked order (from the lowermost stacked sheet), and face-down discharged to the sheet discharge section 16 via conveyance path switching gates 1402 and 18.

In the operation according to the present invention, in preference to an original sheet discharge order, the completely printed transfer sheet is temporarily retracted in the FIFO stack, and discharged out of the FIFO stack at the inherent sheet discharge timing.

In a third function, the printed surface of the sheet is reversed in order to automatically perform double-surface printing, and the transfer sheet is again circulated in the transfer section.

That is, the transfer sheet fixed by the fixing section 12 is conveyed to the ADU side by the conveyance path switching gate 18, and stacked in the FIFO stack 1401. Furthermore, immediately after the transfer sheet is stacked in the FIFO stack 1401, the sheet is taken out, conveyed through a sheet supply conveyance path by the conveyance path switching gate 1402, and fed again to the transfer section 11, and the back surface (non-transfer surface) of the sheet is transferred. Subsequently, the transfer sheet having the transferred back surface is fixed by the fixing section 12 and discharged to the sheet discharge section 16.

Additionally, in an adjustment operation of the sheet discharge order according to the present invention, a circulation path for the double-surface printing can also be used as the stack without using the FIFO stack. Additionally, a condition is that a necessary number of sheets can be held in the circulation path.

Moreover, when the circulation path is used, the FIFO stack becomes unnecessary (a turning mechanism for reversing the sheet is unnecessary) and the mechanism can be simplified. On the other hand, since the transfer sheet passes through the transfer and fixing sections again, a time loss is generated.

An image reading operation in the image reader 2 in which the automatic draft feeder (hereinafter referred to as the ADF) 17 is used will next be described with reference to FIG. 2.

The image reader 2 operates both for: a sheet through reading system in which the reading position of the four line colors CCD sensor 201 is fixed, the draft is moved, and the entire surface of the draft is read; and a flat bed reading system in which the draft is fixed onto the draft laying base 205, the reading position of the four line colors CCD sensor 201 is moved, and the entire surface of the draft is read.

During the sheet through reading, the mirrors 202, 203, 204 are arranged so that the draft image in a fixed position (a) on the draft laying base 205 is read, the draft on the draft laying base 1701 is conveyed to the draft laying base 205, and the entire surface of the draft is read.

During the flat bed reading, after the draft on the draft laying base 1701 is completely conveyed to the draft laying base 205, the mirrors 202, 203, 204 move (b) along the draft laying base 205, and the entire surface of the draft is read.

Additionally, both during the sheet through reading and during the flat bed reading, the mirrors 202, 203, 204 are arranged in order to obtain a constant optical path length along which the reflected light of the draft image of the reading position of the draft reaches the four line colors CCD sensor 201. Particularly, when the reading position of the four line colors CCD sensor 201 moves during the flat bed reading, the mirrors 202, 203, 204 are relatively moved in order to obtain the constant optical path length.

Figure 3:
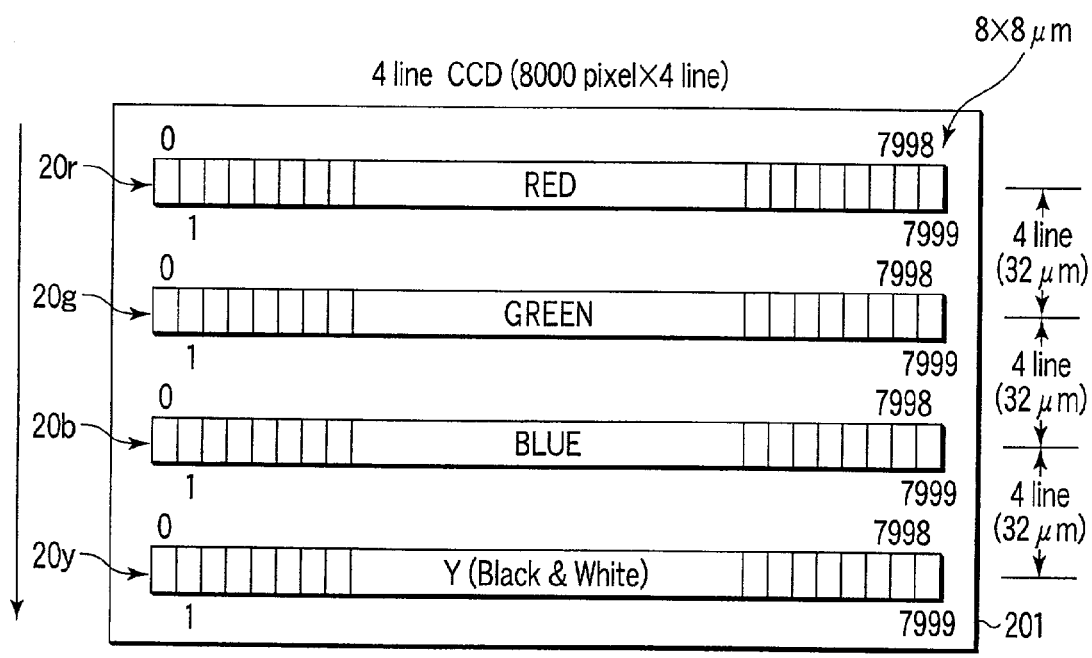
FIG. 3 is a diagram showing an outline of a constitution of a four line colors CCD sensor.

FIG. 3 shows an outline of a constitution of the four line colors CCD sensor 201.

The four line colors CCD sensor 201 has line sensors for four colors, and is constituted of a black-and-white (Y) sensor 20y, R sensor 20r, G sensor 20g, and B sensor 20b. A size of the sensor per pixel is 8×8 µm, and the number of pixels of one line is 8000. Moreover, an interval between the color line sensors is 32 µm, and corresponds to an interval for four lines in terms of the number of pixels of the sensor.

Therefore, when the draft image is read at an equal magnification, the respective color line sensors read the draft images apart from one another by four lines, and it is therefore necessary to correct a line deviation on data in order to obtain image information of the same line on the draft image.

When a reading order of the same line of the draft image is Y, B, G, R, it is preferable to delay a G image by four lines, B image by eight lines, and Y image by twelve lines in order to obtain the image data of the same line as that of the image read by R at this moment.

Moreover, when a movement speed of the reading position is reduced to ¼ and a 400% enlarged image is obtained, it is necessary to delay the G image by 16 lines, B image by 32 lines, and Y image by 48 lines. Conversely, when the movement speed is doubled and a 50% reduced image is obtained, it is preferable to delay the G image by two lines, B image by four lines, and Y image by six lines.

FIG. 4 shows transmission paths of image signals of the four line colors CCD sensor 201. As described above, the four line colors CCD sensor 201 has the black-and-white (Y) sensor 20y, R sensor 20r, G sensor 20g, and B sensor 20b.

First, the R sensor 20r is constituted of: a photodiode 21r for photoelectrically converting the draft image; a shift gate 21rs for transferring a photoelectrically converted charge to a CCD analog shift register 22r; the CCD analog shift register 22r for transferring the charge for one line for each pixel in order; and an output buffer 23r for outputting the charge transferred for each pixel as a voltage signal.

The G sensor 20g is constituted of: a photodiode 21g for photoelectrically converting the draft image; a shift gate 21gs for transferring the photoelectrically converted charge to a CCD analog shift register 22g; the CCD analog shift register 22g for transferring the charge for one line for each pixel in order; and an output buffer 23g for outputting the charge transferred for each pixel as the voltage signal.

The B sensor 20b is constituted of: a photodiode 21b for photoelectrically converting the draft image; a shift gate 21bs for transferring the photoelectrically converted charge to a CCD analog shift register 22b; the CCD analog shift register 22b for transferring the charge for one line for each pixel in order; and an output buffer 23b for outputting the charge transferred for each pixel as the voltage signal.

The photodiodes 21r, 21g, 21b transfer the charges to the CCD analog shift registers 22r, 22g, 22b by a shift gate signal SH_RGB. The pixels in the CCD analog shift registers 22r, 22g, 22b are successively transferred by transfer clocks Φ1_RGB, and Φ2_RGB (signal having a phase opposite to that of Φ1_RGB).

Moreover, the Y sensor 20y basically has the same constitution as that of the color line sensor (R, G, B), but the CCD analog shift register is divided into four for a right half and left half of a photodiode 21y and further for an odd-number pixel and even-number pixel in order to read out the image signal for one line at a time of ¼ of a time for the color signal without changing each charge transfer speed of the CCD analog shift register.

Concretely, since the charge of the photodiode 21y is simultaneously transferred to CCD analog shift registers 22ya, 22yb, 22yc, 22yd, a four-times transfer speed is realized. The charge transferred for each pixel by each of the CCD analog shift registers 22ya, 22yb, 22yc, 22yd is converted to the voltage signal and outputted by each of output buffers 23yao, 23ybo, 23yco, 23ydo.

The charge transfer to the CCD analog shift registers 22ya, 22yb, 22yc, 22yd from the photodiode 21y of the Y sensor 20y is performed by a shift gate signal SH—Y common to the lines.

Charge transfer clocks φ1_Ya, φ_Yb, φ1_Yc, φ1_Yd, φ2_Ya, φ2_Yb, φ2_Yc, φ2_Yd φ2 has a phase opposite to that of φ1) of the CCD analog shift registers 22ya, 22yb, 22yc, 22yd can be supplied independently for the respective CCD analog shift registers, and transfer timings can individually be controlled.

FIG. 5 shows a constitution of a data processing block of the image forming apparatus in which the four line colors CCD sensor 201 is used.

As shown in FIG. 5, the image forming apparatus 50 is constituted of: the four line colors CCD sensor 201 for reading the image of the draft and converting the image to an electric signal; a CCD sensor output signal processor 4000; a scanner image processor 5000; an image handling section 6000; a printer image processor 7000; and a printer engine 8000.

The four line colors CCD sensor 201 and CCD sensor output signal processor 4000 in the present invention will next be described with reference to FIG. 6.

Figure 6:
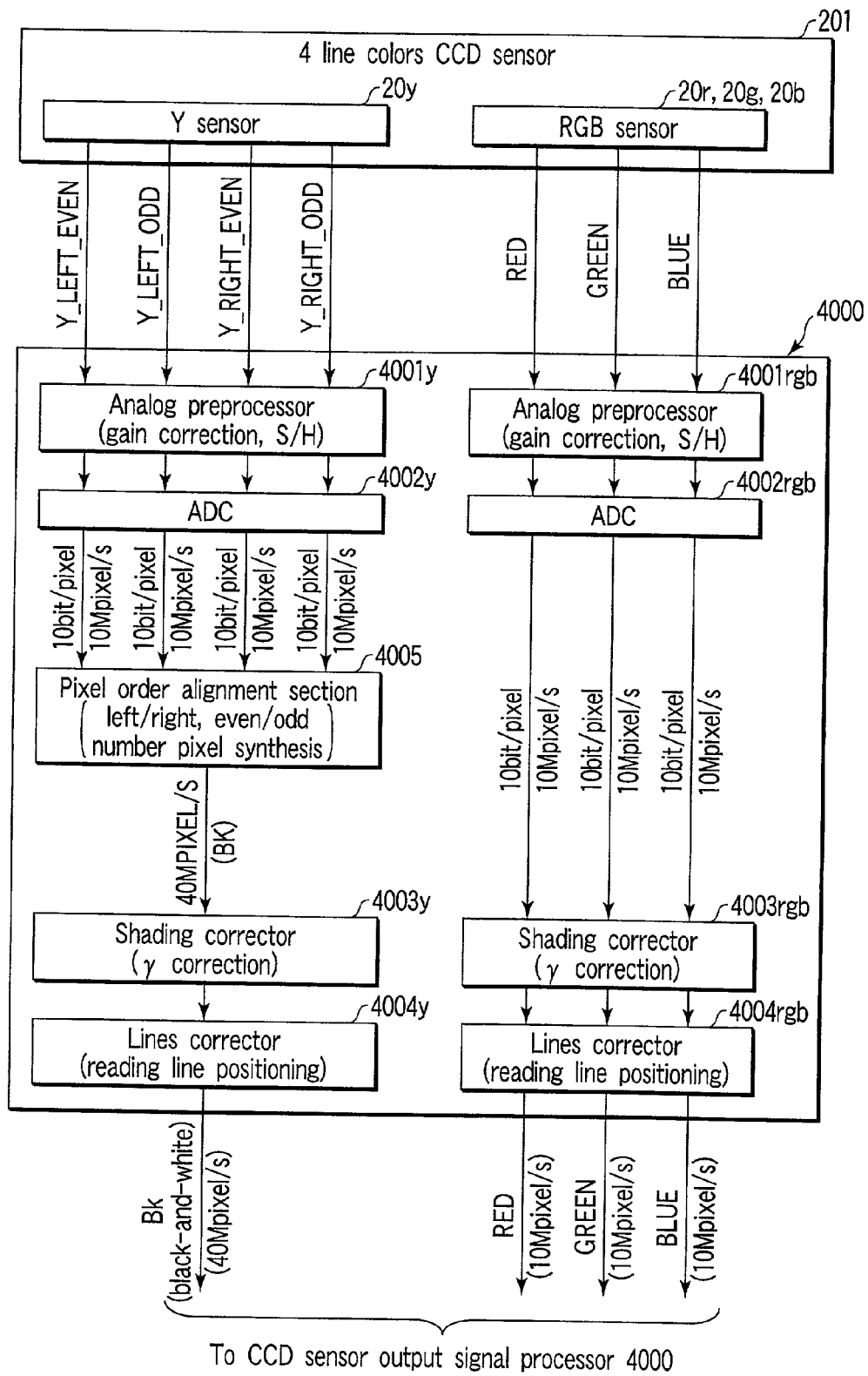
FIG. 6 is a diagram showing a constitution example of the four line colors CCD sensor and a CCD sensor signal processor.

In FIG. 6, the four line colors CCD sensor 201 reads the draft image of black-and-white (Y), red (hereinafter referred to R), green (hereinafter referred to G), and blue (hereinafter referred to B) by the respective line sensors (20y, 20r, 20g, 20b) by a line unit.

For the Y sensor 20y, in order to read a black-and-white image at a high speed, an output of the line sensor is divided into four: a left-side even-number pixel (Y_LEFT_EVEN); a left-side odd-number pixel (Y_LEFT_ODD); a right-side even-number pixel (Y_RIGHT_EVEN); and a right-side odd-number pixel (Y_RIGHT_ODD). The image can therefore be read at a speed four times the speed of the color sensor (R, G, B). Additionally, the respective four divided outputs of the Y sensor 20y are subjected to an AD conversion processing at the same speed as that of the color sensor output (R, G, B). In an example of FIG. 6, the output is processed at 10 bits, 10 Mpixel/s.

The CCD sensor output signal processor 4000 is constituted of: analog preprocessors 4001y, 4001rgb; ADC 4002y, 4002rgb; a pixel order alignment section 4005; shading correctors 4003y, 4003rgb; and interline correctors 4004y, 4004rgb.

One analog preprocessor 4001y performs gain correction of four outputs from the Y sensor 20y, and analog preprocessings such as sample & hold.

The ADC 4002y converts four output analog signals preprocessed by the analog preprocessor 4001y to respective digital signals.

The pixel order alignment section 4005 aligns pixel data divided for left, right, even number, and odd number by the Y sensor 20y in an original order and outputs black-and-white (Bk) image data. In this case, since the four divided image data are put into one, the image data speed becomes fourfold (10 bits, 40 Mpixel/s in the example of FIG. 6).

The shading corrector 4003y performs shading correction and $\gamma$ correction of the digital signal of the Y sensor 20y.

The interline corrector 4004y performs interline correction so that all image data of black-and-white (Bk), R, G, B are in the same position (line) with simultaneous use of the respective outputs from the Y sensor 20y, R sensor 20r, G sensor 20g, B sensor 20b. Additionally, when only the signal of the Y sensor 20y is used, the interline correction is unnecessary.

On the other hand, the analog preprocessor 4001rgb performs the gain correction of the respective outputs from the R sensor 20r, G sensor 20g, and B sensor 20b, and analog preprocessings such as sample & hold.

The ADC 4002rgb converts the analog signals of the respective preprocessed outputs to the respective digital signals.

The shading corrector 4003rgb performs the shading correction and $\gamma$ correction of the respective digital signals of the R, G, B sensors.

The interline corrector 4004rgb performs the correction of a reading line position of the draft with respect to the Y sensor 20y, and R, G, B signals from the R sensor 20r, G sensor 20g, and B sensor 20b. By the correction, the interline corrector 4004rgb outputs the respective R, G, B image data as the reading signal of the same position (line) of the draft.

Figure 7:
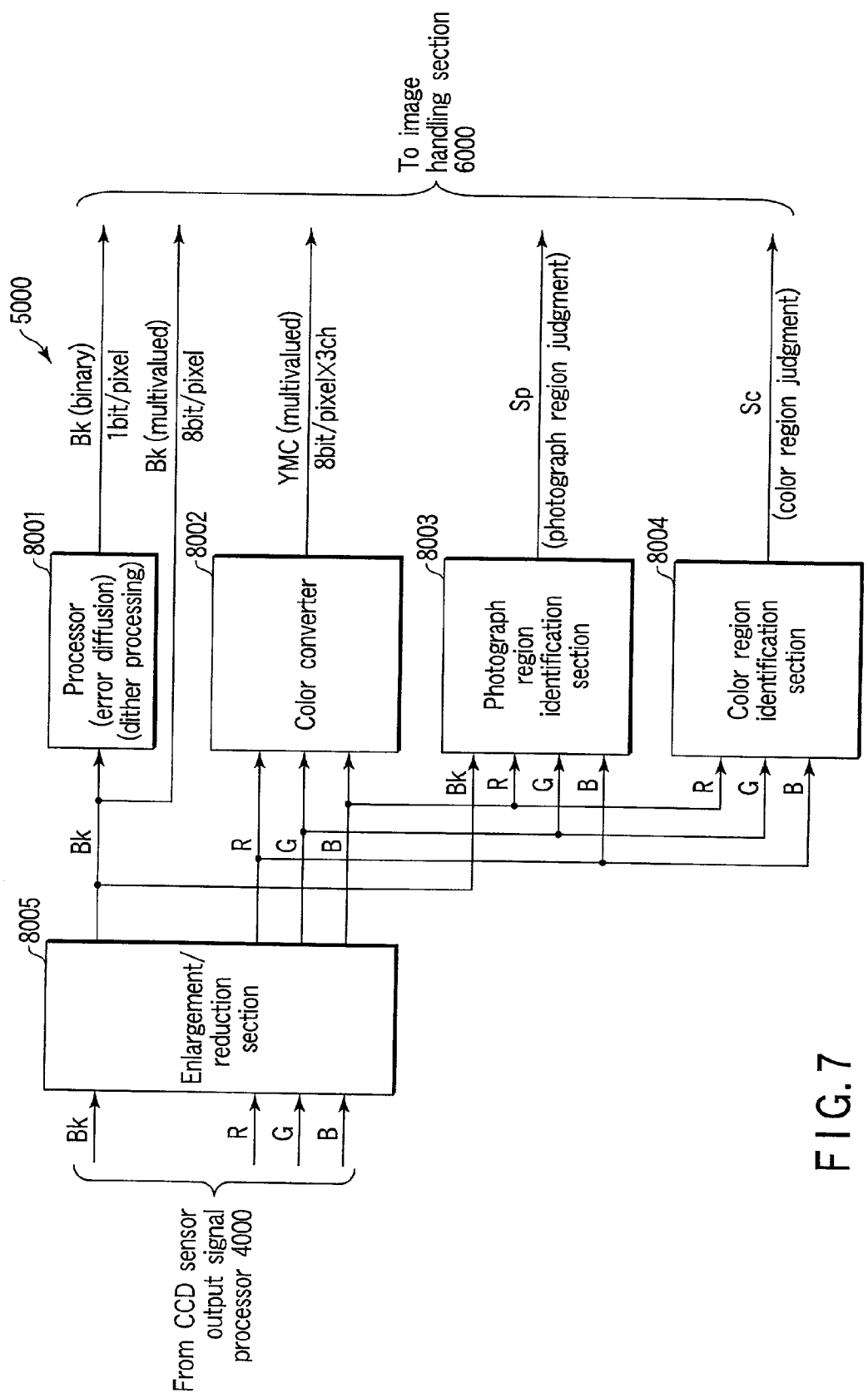
FIG. 7 is a diagram showing a constitution example of a scanner image processor.

FIG. 7 shows a constitution example of the scanner image processor 5000.

The scanner image processor 5000 is constituted of: an enlargement/reduction section 8005 for enlarging/reducing respective black-and-white (Bk), color (R, G, B) image data; a processor 8001 for subjecting the black-and-white (Bk) image data to error diffusion and dither processing; a color converter 8002 for converting an RGB signal to a YMC (yellow, magenta, cyan) signal; a photograph region identification section 8003 for judging whether or not a noted pixel is a photograph region from the black-and-white (Bk) image data or the R, G, B image data; and a color region identification section 8004 for judging whether the noted pixel is chromatic or achromatic.

Figure 8:
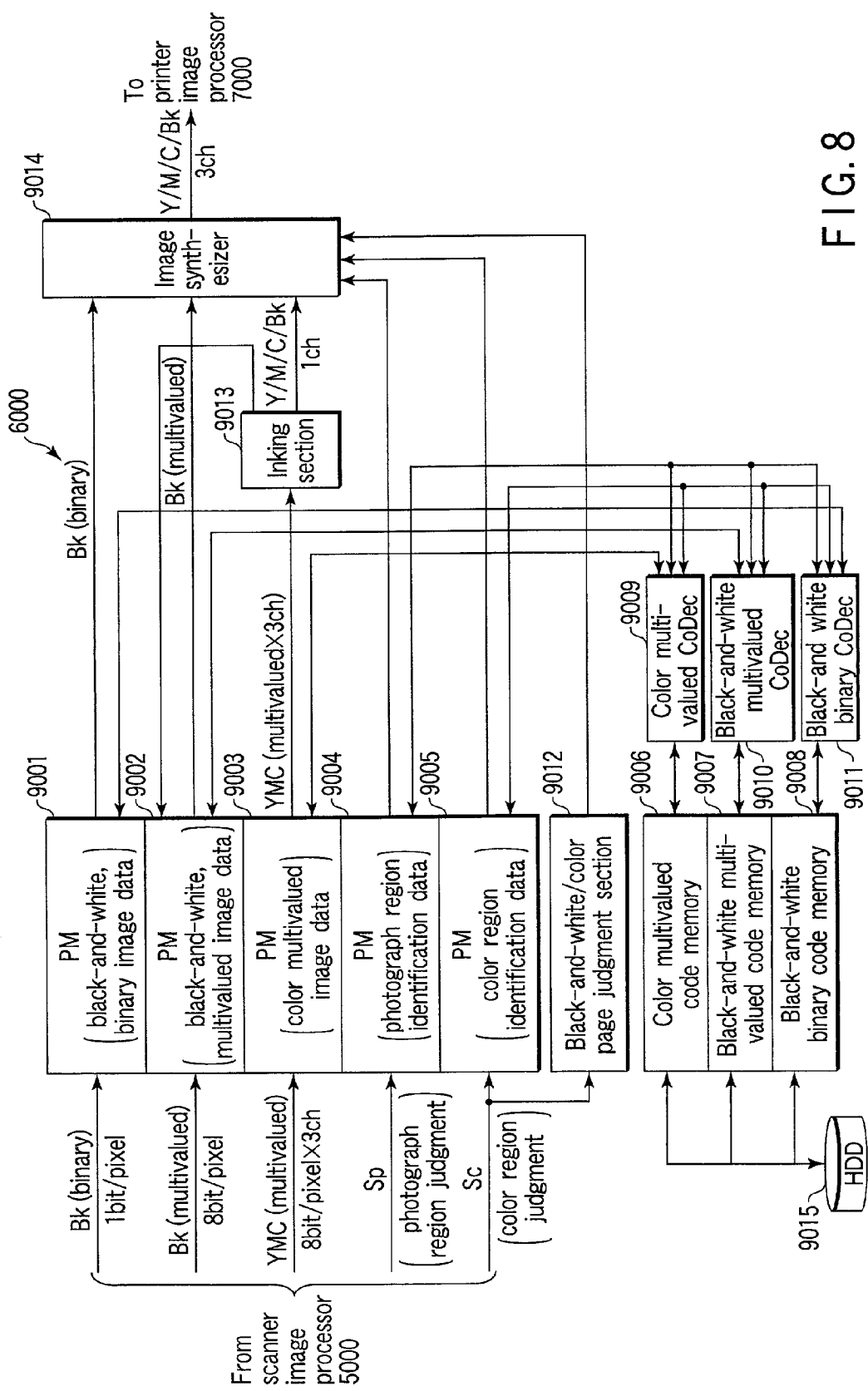
FIG. 8 is a diagram showing a constitution example of an image handling section.

FIG. 8 shows a constitution example of the image handling section 6000.

The image handling section 6000 is constituted of: page memories (PM) 9001, 9002, 9003, 9004, 9005; a color multivalued code memory 9006; a black-and-white multivalued code memory 9007; a black-and-white binary code memory 9008; a color multivalued CoDec 9009; a black-and-white multivalued CoDec 9010; a black-and-white binary CoDec 9011; a black-and-white/color page judgment section 9012; an inking section 9013; an image synthesizer 9014; and a hard disk device (HDD) 9015.

The page memory 9001 stores black-and-white binary image data read by the image reader 2.

The page memory 9002 stores black-and-white multivalued image data read by the image reader 2.

The page memory 9003 stores color (multivalued) image data read by the image reader 2.

The page memory 9004 stores photograph region identification data.

The page memory 9005 stores color region identification data.

The color multivalued code memory 9006 stores the image data compressed by the color multivalued CoDec 9009.

The black-and-white multivalued code memory 9007 stores the image data compressed by the black-and-white multivalued CoDec 9010.

The black-and-white binary code memory 9008 stores the image data compressed by the black-and-white binary CoDec 9011.

The color multivalued CoDec (coder, decoder) 9009 compresses/extends the image data in order to reduce a size of the color multivalued image data and efficiently accumulate and read the data with respect to the HDD 9015.

The black-and-white multivalued CoDec (coder, decoder) 9010 compresses/extends the image data in order to reduce the size of the black-and-white multivalued image data and efficiently accumulate and read the data with respect to the HDD 9015.

The black-and-white binary CoDec (coder, decoder) 9011 compresses/extends the image data in order to reduce the size of the black-and-white binary image data and efficiently accumulate and read the data with respect to the HDD 9015.

The black-and-white/color page judgment section 9012 judges a control mode and a black-and-white/color page.

The inking section 9013 generates independent yellow (Y), magenta (M), cyan (C), black (Bk) signals from the yellow, magenta, cyan (YMC) signal from the PM 9003.

The image synthesizer 9014 switches the black-and-white binary signal, black-and-white multivalued signal, Y, M, C, Bk color multivalued signal by the page unit and synthesizes the signal by a pixel unit based on the photograph region identification data and color region identification data.

The HDD 9015 accumulates code data and image data.

Examples of the operation of the image handling section 6000 include image edition and image rotation by the page memory, electronic sorting of the black-and-white and color images, high-efficiency image compression by photograph region identification, pixel unit switching and image output of the achromatic pixel and color pixel by the photograph region identification, and the like.

First, the image edition and image rotation by the page memories 9001, 9002, 9003 will be described.

The page memories 9001, 9002, 9003 store the image data from the image reader 2 by the page unit, and can thereby repeatedly output the same image data with one draft reading, so that the apparatus can have a reduced power consumption and little noise by the reading.

Moreover, the page memories 9001, 9002, 9003 change a reading direction of the once stored image data, and can thereby easily output the image data rotated by a 90 degree unit.

Furthermore, in the page memories 9001, 9002, 9003, when a plurality of pages of reduced and stored image data are arranged in one page of image memory in a desired layout, and this enables a Nin1 operation for outputting the plurality of pages of images in one sheet.

The electronic sorting of the black-and-white and color images will next be described.

The electronic sorting is a function for accumulating and reading the image data with respect to the HDD 9015 and thereby electronically performing sorting/copying without using a mechanical sorter or reading the same draft a plurality of times.

The black-and-white binary image data read from the image reader 2 is stored in the black-and-white binary page memory 9001, simultaneously coded by the black-and-white binary CoDec 9011, thereby compressed, and accumulated in the HDD 9015 via the black-and-white binary code memory 9008.

The accumulated image data is read from the HDD 9015 in a desired order, decoded by the black-and-white binary CoDec 9011 via the black-and-white binary code memory 9008, and developed as original image data in the black-and-white binary page memory 9001.

For a first page, the printing of the read draft and the accumulation thereof into the HDD 9015 are simultaneously performed. For second and subsequent pages, a necessary number of pages of image data are read/printed from the HDD 9015 in accordance with a printing order.

The black-and-white multivalued image data and color multivalued image data are similarly stored into the page memories 9002, 9003 from the image reader 2, coded and compressed by the black-and-white multivalued CoDec 9010 and color multivalued CoDec 9009, and accumulated in the HDD 9015 via the black-and-white multivalued code memory 9007 and color multivalued code memory 9006.

The accumulated black-and-white multivalued image data and color multivalued image data are similarly read from the HDD 9015, decoded by the black-and-white multivalued CoDec 9010 and color multivalued CoDec 9009 via the black-and-white multivalued code memory 9007 and color multivalued code memory 9006, and developed in the page memories 9002, 9003.

Similarly as described above, for the first page, the printing of the read draft and the accumulation thereof into the HDD 9015 are simultaneously performed. For the second and subsequent pages, the necessary number of pages of image data are read/printed from the HDD 9015 in accordance with the printing order.

The high-efficiency image compression by the photograph region identification will next be described.

It is possible to highly efficiently subject a document having character and photograph image data intermingled in the page to data compression and increase an image data storage amount per storage capacity into a storage medium. It is also possible to enhance a transfer efficiency in transferring the image data to a network.

One technique for enhancing a compression ratio of the data includes: separating one page of image data into a character region and photograph region; subjecting the character region as a binary image to the data compression by a coding system suitable for the binary image; and subjecting the photograph region as a multivalued image to the data compression by the coding system suitable for the multivalued image.

Thereby, efficient image compression is enabled without deteriorating characteristics of both the character image data and the photograph image data.

In the present embodiment, for the black-and-white image data, the black-and-white binary image data subjected to the error diffusion and dither processing by the processor 8001 during reading and non-processed black-and-white multivalued image data are stored in the black-and-white binary page memory 9001 and black-and-white multivalued page memory 9002, respectively. Furthermore, photograph region identification data as an identification result for one page is stored as the photograph region identification data of the pixel unit in the page memory 9004.

For the black-and-white binary image data, the image data obtained by masking the photograph region with the photograph region identification data is coded. For the black-and-white multivalued image data, the image data obtained by masking a region other than the photograph region with the photograph region identification data is coded.

During reproduction of the image data, decoded data of both image data may be synthesized.

Moreover, when the photograph region identification data is coded as the binary image data, and stored as region attribute information of the pixel unit, it is possible to code only a necessary region in binary and multivalued manners without masking the image data, and to reproduce the original image based on the region attribute information.

Pixel unit switching image data output of an achromatic pixel and color (chromatic) pixel by the color region identification data will next be described.

When the four line colors CCD sensor 201 is used, the Y sensor 20y for exclusive use in black-and-white is utilized for the black-and-white image data. Thereby, as compared with generation of the black-and-white image data from the R, G, B signals, for example, using a three lines CCD sensor, an influence of reading position deviation by vibration or position precision is small, and the black-and-white image data having a high precision and quality can be obtained.

In the present embodiment, the black-and-white image data of the draft image is once stored in the black-and-white binary page memory 9001 or the black-and-white multivalued page memory 9002 by the Y sensor 20y for exclusive use in black-and-white. Additionally, the color region identification data is stored in the page memory 9005. Moreover, the black-and-white binary image data or the black-and-white multivalued image data for the achromatic region, and the color multivalued image data for the region other than the achromatic region is selectively printed/outputted by the pixel unit based on the color region identification data during reading and printing/outputting of the color multivalued image. Since the data is outputted in this manner, a high-quality copy image can be obtained.

Moreover, the color image is read with a low resolution simultaneously with the reading of the black-and-white image. Based on the color region identification data, the black-and-white image data is outputted for the achromatic region, and the black-and-white multivalued image data is used as luminance information for the region other than the achromatic region. The color multivalued image data having a low resolution is used as color information having the low resolution, and the color multivalued image data is generated. Since the data is generated in this manner, it is also possible to generate high-quality copy image data.

A first embodiment of the image forming apparatus according to the present invention in this constitution will next be described.

In the first embodiment, in a black-and-white and/or color automatic judgment copy mode, during sheet (draft) reading, the draft is main-scanned with black-and-white and stored in the page memory, and additionally pre-scanned with color. With the black-and-white draft, the black-and-white image data stored in the page memory is printed. With the color draft, the draft is main-scanned with color in the flat bed system and color printing is performed (when there are only black-and-white drafts, continuous copying is enabled without any loss of black-and-white and/or color judgment).

A copying sequence of black-and-white/color intermingled drafts by the image reader 2 using the four line colors CCD sensor 201 in the black-and-white and/or color automatic judgment copy mode will be described hereinafter.

Figure 9:
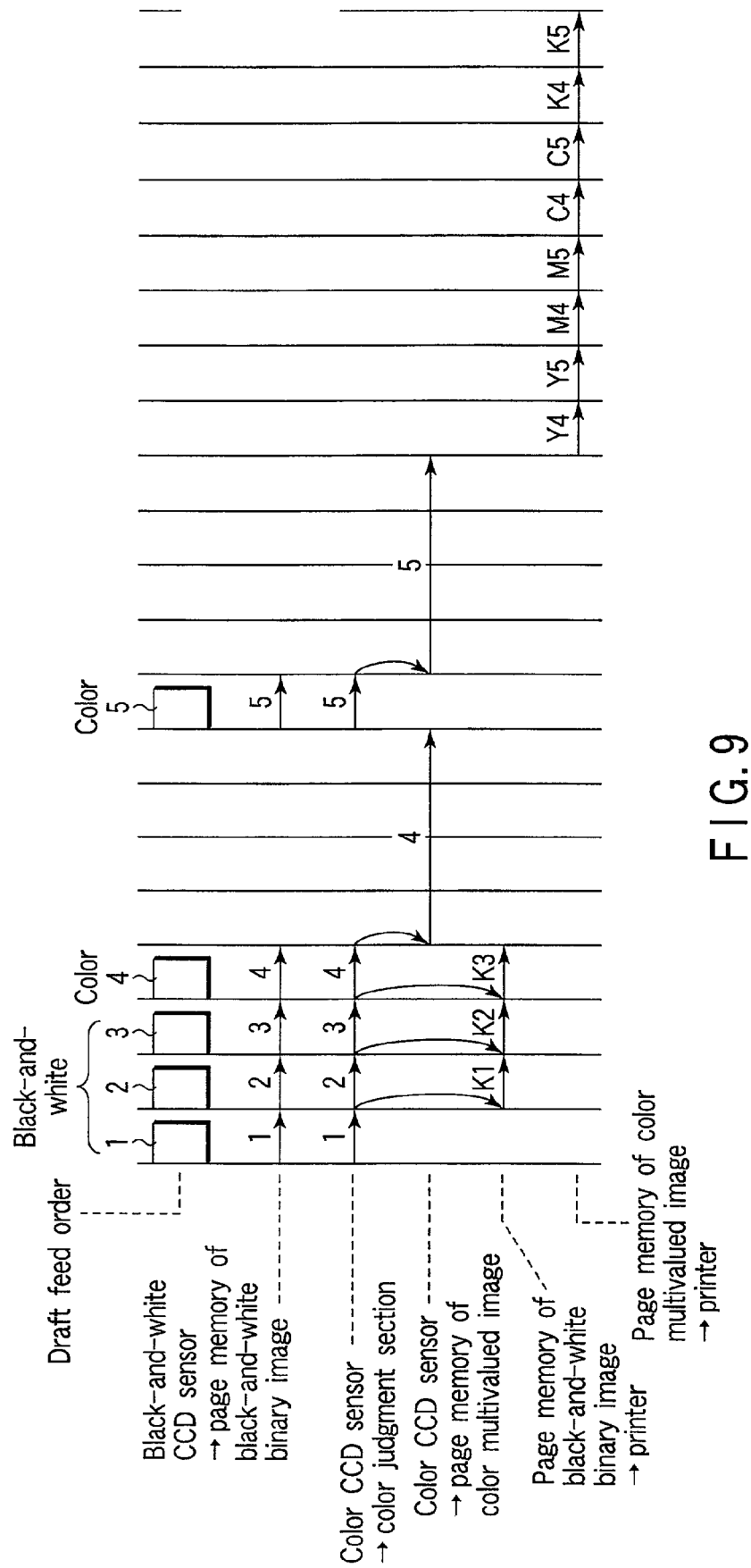
FIG. 9 is a time chart showing a timing at which black-and-white and/or color intermingled drafts are copied by automatic judgment of black-and-white and/or color.

FIG. 9 shows a time chart for copying the black-and-white and/or color intermingled drafts by the automatic judgment of black-and-white and/or color.

In FIG. 9, it is assumed that a draft having first to third black-and-white pages and fourth and fifth color pages is set on the ADF 17. The sequence for copying the black-and-white and/or color intermingled draft by the automatic judgment of black-and-white and/or color will be described.

In the present embodiment, according to the constitution of the four line colors CCD sensor 201, the reading speed of the color image is assumed to be ¼ of the reading speed of the black-and-white image at the same resolution. Moreover, when the black-and-white image and color image are simultaneously read, the reading resolution of the color image is reduced to ¼.

First, when the draft on the ADF 17 is fed to the draft base 205, sheet through reading is performed by moving the draft while fixing the reading position in the reading position (a) shown in FIG. 2. The black-and-white multivalued image data read by the Y sensor 20y is processed by the processor 8001 and resulting black-and-white binary image data is stored in the black-and-white binary page memory 9001. Moreover, when there is a request for two or more copies at the same time, the image data is managed and accumulated by the page unit in the HDD 9015 via the black-and-white binary CoDec 9011 and black-and-white binary code memory 9008.

Furthermore, during the sheet through reading of the black-and-white binary image, the R sensor 20r, G sensor 20g, and B sensor 20b simultaneously read the color image at the ¼ resolution. The color region identification section 8004 outputs a color region judgment result (Sc) based on the read color image data (R, G, B).

The black-and-white and/or color page judgment section 9012 totals the color region judgment results (Sc) from the color region identification section 8004 by the page unit, and judges whether the read page is the black-and-white draft or the color draft. Therefore, the black-and-white and/or color judgment of the page is completed simultaneously with the sheet through reading of the black-and-white binary image.

When black-and-white is judged as the black-and-white and/or color judgment result of the page, the black-and-white binary image data stored in the black-and-white binary page memory 9001 is transmitted to the printer 30, and the printing operation of a black-and-white single-color image is performed.

When the color is judged as the black-and-white and/or color judgment result of the page, the color draft on the draft base 205 is read at a ¼ speed of the black-and-white reading speed by the flat bed reading by the reading position movement ((b) shown in FIG. 2). Moreover, the read color multivalued (R, G, B) image data is stored in the color multivalued page memory 9003. Moreover, when there is a request for two or more copies at the same time, the image data is managed and accumulated in the HDD 9015 by the page unit via the color multivalued CoDec 9009 and color multivalued code memory 9006.

Moreover, when the read image is judged to be a color image and it is possible to form a plurality of pages on the intermediate transfer section 10 having an A3 size, the reading operation of the subsequent draft is performed.

With only a plurality of color pages, the plurality of pages can simultaneously be subjected to a color superposing sequence of respective colors such as Y→M→C→Bk. Moreover, when the plurality of pages are intermingled with color and black-and-white pages, the black-and-white image data can simultaneously be processed by printing only Bk in the color superposing sequence.

In the example of FIG. 9, the black-and-white image for first three pages is printed by a black-and-white printing sequence, and the color image for the subsequent two pages is printed as a plurality of color pages by a color printing sequence.

Figure 10:
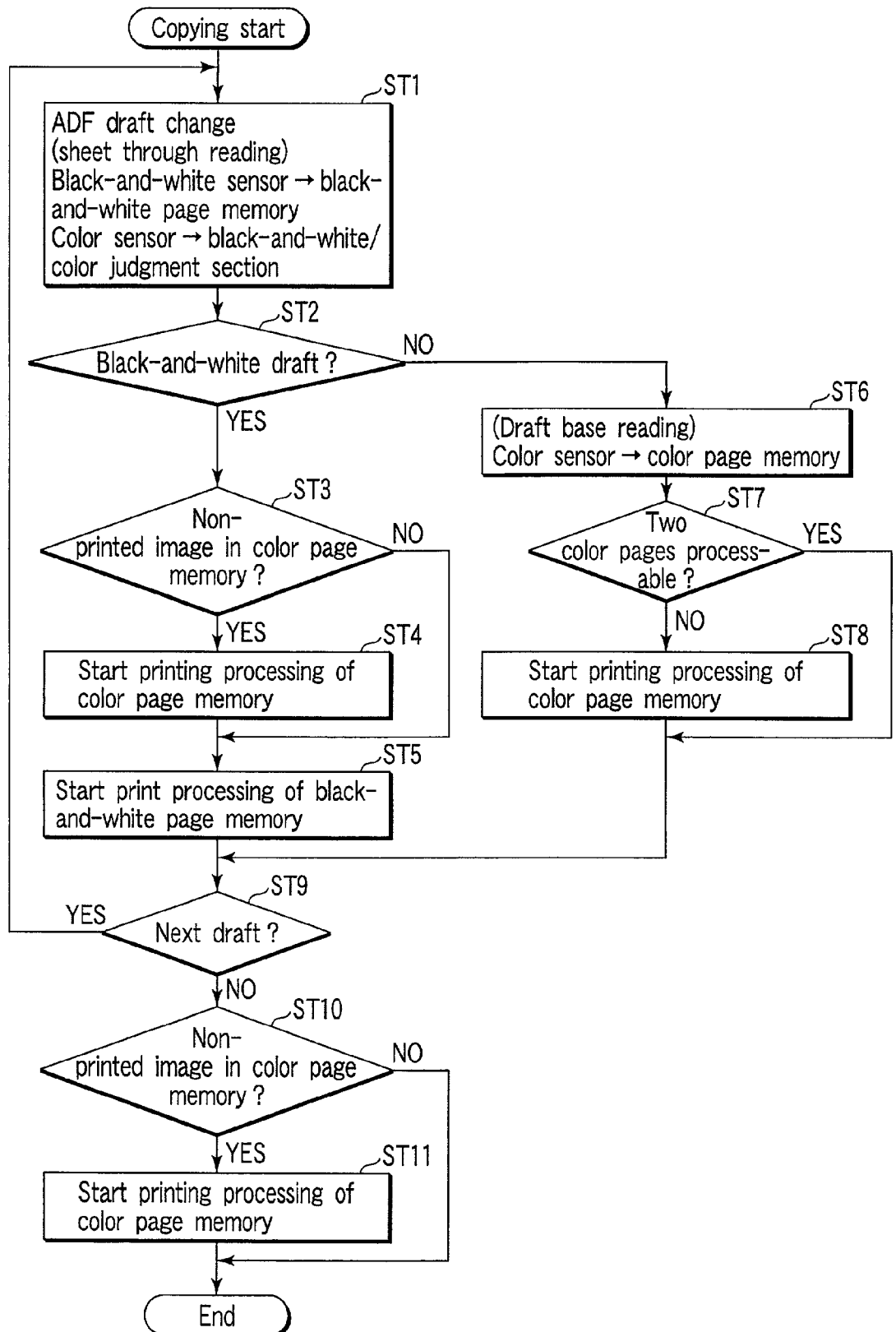
FIG. 10 is a flowchart showing a copying operation of a first embodiment.

The aforementioned copying operation of the first embodiment will next be described with reference to a flowchart of FIG. 10.

First, when the user I/F section 6 instructs the system controller 1 to start copying, the controller performs the sheet through reading by the ADF 17. In this case, the system controller 1 reads the draft by the black-and-white (Y) sensor 20y, processes the black-and-white multivalued image data into the black-and-white binary image data by the processor 8001, and stores the black-and-white binary image data into the black-and-white binary page memory 9001 (ST1).

Furthermore, the system controller 1 simultaneously reads the draft by the R sensor 20r, G sensor 20g, and B sensor 20b as color sensors by the sheet through reading (at a ¼ resolution of the resolution of the Y sensor 20y), and identifies the color region from the read R, G, B signals by the color region identification section 8004 (ST1).

The system controller 1 uses the black-and-white and/or color page judgment section 9012 to judge whether or not the draft is the black-and-white draft from the color region judgment result (Sc) identified by the color region identification section 8004 (ST2).

With the black-and-white draft, the system controller 1 judges whether or not there is a non-printed image data in the page memory 9003 with the color multivalued image data stored therein (ST3). When there is the non-printed image data, a printing processing of the image data stored in the page memory 9003 is started (ST4).

When there is not the non-printed image data in the page memory 9003 in the step ST3, and the printing processing of the step ST4 ends, the system controller 1 starts the printing processing of the black-and-white binary image data stored in the page memory 9001 (ST5).

Moreover, when the draft is not black-and-white in the step ST2, the system controller 1 reads the color draft on the draft base 205 by the R sensor 20r, G sensor 20g, and B sensor 20b by the flat bed reading ((b) shown in FIG. 2) by the reading position movement (main scan of color: ¼ speed of the black-and-white reading speed), and stores the color multivalued (R, G, B) image data in the page memory 9003 (ST6).

Subsequently, the system controller 1 judges whether or not two color pages can be processed (ST7). If the two color pages cannot be processed, the printing processing of the color multivalued image data is started (ST8).

After the end of the printing processing of the step ST5, or when two color pages can be processed in the step ST7, or after the end of the printing processing of the step ST8, the system controller 1 judges presence/absence of the next draft (ST9). If there is the next draft, the flow returns to the step ST1.

If there is not the next draft in the step ST9, the system controller 1 checks presence/absence of the non-printed image data in the page memory 9003 with the color multivalued image data stored therein (ST10). If there is the non-printed image data, the printing processing of the image data is started (ST1).

Finally, when there is not the non-printed color multivalued image data in the step ST10, or after the printing processing of the step ST11 ends, the system controller 1 ends the copying operation.

As described above, according to the first embodiment, during copying of the plurality of drafts including the black-and-white and color drafts by the ADF, it is automatically judged whether the draft is of black-and-white or color without deteriorating productivity of black-and-white copying. The respective optimum black-and-white printing sequence and color printing sequence by the sheet through reading can be performed.

Moreover, the user can thereby perform high-productivity copying by an appropriate printing sequence without noticing a type of black-and-white and/or color of the draft.

A second embodiment will next be described.

In the second embodiment, in the black-and-white and/or color automatic judgment copying mode, during the flat bed reading, main scanning is performed with black-and-white, the data is stored in the page memory, and color pre-scanning is simultaneously performed. With the black-and-white draft, the black-and-white image data stored in the page memory is printed. With the color draft, a carriage is moved back, the color main scanning is performed, and color printing is performed (if there are only black-and-white drafts, continuous copying is possible without any loss of black-and-white and/or color judgment.

In FIG. 9, it is assumed that the draft having first to third black-and-white pages and fourth and fifth color pages is set on the ADF 17. The sequence for copying the black-and-white and/or color intermingled draft by the automatic judgment of black-and-white and/or color will be described.

In the present embodiment, according to the constitution of the four line colors CCD sensor 201, the reading speed of the color image is ¼ of the reading speed of the black-and-white image at the same resolution. Therefore, when the black-and-white image and color image are simultaneously read, the reading resolution of the color image is reduced to ¼.

First, when the draft on the ADF 17 is fed to the draft base 205, the black-and-white binary image of the color draft on the draft base 205 is read by the flat bed reading by the reading position movement ((b) shown in FIG. 2). The black-and-white multivalued image data read by the Y sensor 20y is processed into the black-and-white binary image data by the processor 8001 and stored in the black-and-white binary page memory 9001. Moreover, there is a demand for two or more copies at the same time, the image data is managed and accumulated in the HDD 9015 by the page unit via the black-and-white binary CoDec 9011, and black-and-white binary code memory 9008.

Moreover, during the flat bed reading of the black-and-white binary image, the R sensor 20r, G sensor 20g, B sensor 20b simultaneously read the color image at the ¼ resolution. The color region identification section 8004 outputs the color region judgment result (Sc) based on the read color image data (R, G, B).

The black-and-white and/or color page judgment section 9012 totals the color region judgment results (Sc) from the color region identification section 8004 by the page unit, and judges whether the read page is the black-and-white draft or the color draft. Therefore, the black-and-white and/or color judgment of the page is completed simultaneously with the flat bed reading of the black-and-white binary image.

When black-and-white is judged as the black-and-white and/or color judgment result of the page, the black-and-white binary image data stored in the black-and-white binary page memory 9001 is transmitted to the printer 30, and the printing operation of the black-and-white single-color image is performed.

When color is judged as the black-and-white and/or color judgment result of the page, the color draft on the draft base 205 is read at the ¼ speed of the black-and-white reading speed by the flat bed reading by the reading position movement ((b) shown in FIG. 2). The read color multivalued (R, G, B) image data is stored in the color multivalued page memory 9003. Moreover, when there is a request for two or more copies at the same time, the image data is managed and accumulated in the HDD 9015 by the page unit via the color multivalued CoDec 9009 and color multivalued code memory 9006.

Moreover, when the read image is judged to be the color image and it is possible to form a plurality of pages on the intermediate transfer section 10 having the A3 size, the reading operation of the subsequent draft is performed.

With only a plurality of color pages, the plurality of pages can simultaneously be subjected to the color superposing sequence of respective colors such as Y→M→C→Bk. Moreover, when the plurality of pages are intermingled with color and black-and-white pages, the black-and-white image data can simultaneously be processed by printing only Bk in the color superposing sequence.

In the example of FIG. 9, the black-and-white image for first three pages is printed by the black-and-white printing sequence, and the color image for the subsequent two pages is printed as the plurality of color pages by the color printing sequence.

Figure 11:
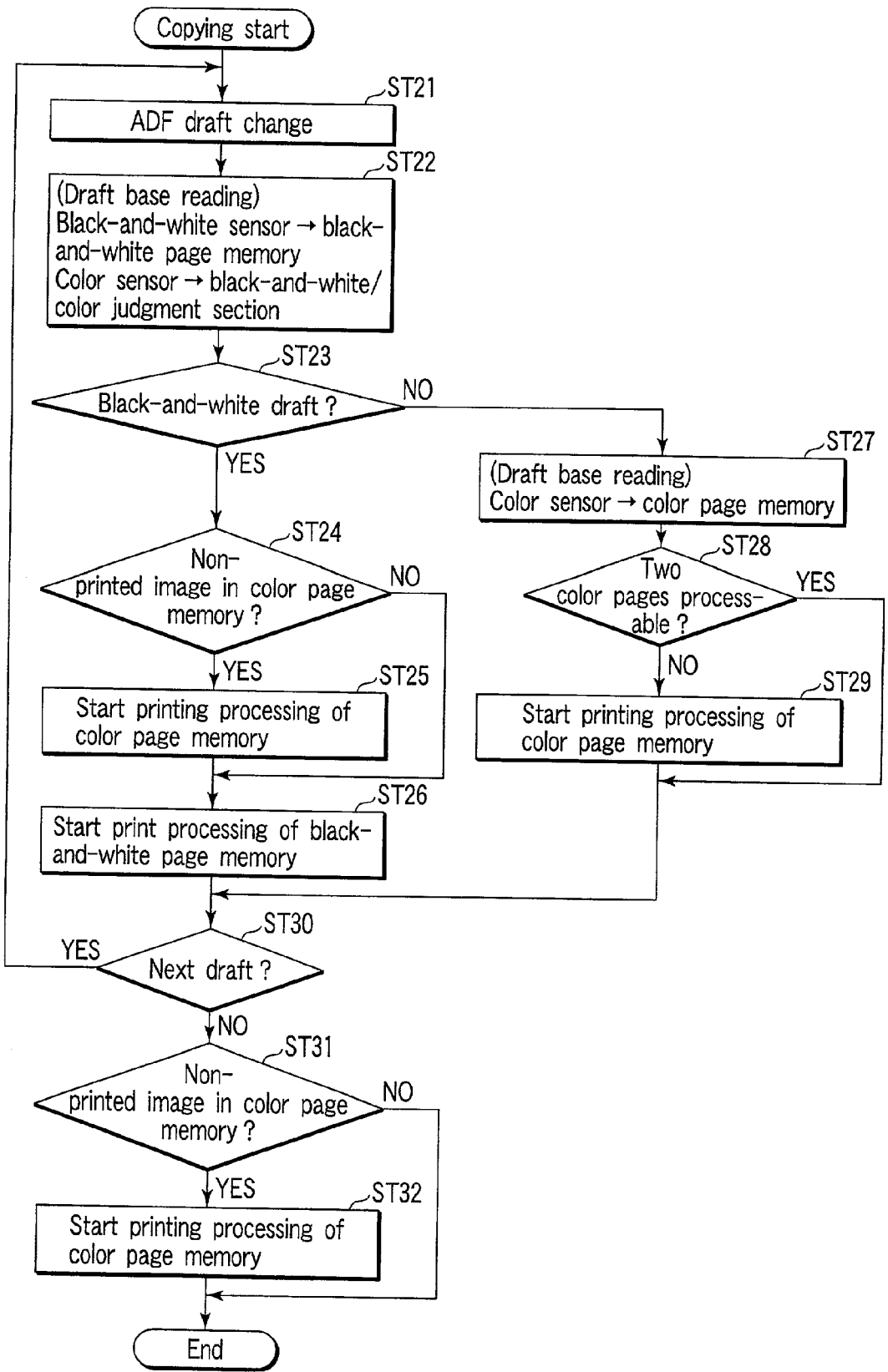
FIG. 11 is a flowchart showing the copying operation of a second embodiment.

The aforementioned copying operation of the second embodiment will next be described with reference to a flowchart of FIG. 11.

First, when the user I/F section 6 instructs the system controller 1 to start copying, the controller performs the flat bed reading by the ADF 17 (ST21). In this case, the system controller 1 reads the draft by the black-and-white (Y) sensor 20y, processes the black-and-white multivalued image data into the black-and-white binary image data by the processor 8001, and stores the black-and-white binary image data into the black-and-white binary page memory 9001 (ST22).

Furthermore, the system controller 1 simultaneously reads the draft by the R sensor 20r, G sensor 20g, and B sensor 20b as the color sensors (at the ¼ resolution of the resolution of the Y sensor 20y), and identifies the color region from the read R, G, B signals by the color region identification section 8004 (ST22).

The system controller 1 uses the black-and-white and/or color page judgment section 9012 to judge whether or not the draft is the black-and-white draft from the color region judgment result (Sc) identified by the color region identification section 8004 (ST23).

With the black-and-white draft, the system controller 1 judges whether or not there is the non-printed image data in the page memory 9003 with the color multivalued image data stored therein (ST24). When there is the non-printed image data, the printing processing of the image data stored in the page memory 9003 is started (ST25).

When there is not the non-printed image data in the page memory 9003 in the step ST24, and the printing processing of the step ST25 ends, the system controller 1 starts the printing processing of the black-and-white binary image data stored in the page memory 9001 (ST26).

Moreover, when the draft is not black-and-white in the step ST23, the system controller 1 reads the color draft on the draft base 205 by the R sensor 20r, G sensor 20g, and B sensor 20b by the flat bed reading by the reading position movement (main scan of color: ¼ speed of the black-and-white reading speed), and stores the color multivalued (R, G, B) image data in the page memory 9003 (ST27).

Subsequently, the system controller 1 judges whether or not two color pages can be processed (ST28). If the two color pages cannot be processed, the printing processing of the color multivalued image data is started (ST29).

After the end of the printing processing of the step ST26, or when two color pages can be processed in the step ST28, or after the end of the printing processing of the step ST29, the system controller 1 judges the presence/absence of the next draft (ST30). If there is the next draft, the flow returns to the step ST21.

If there is not the next draft in the step ST30, the system controller 1 checks the presence/absence of the non-printed color multivalued image data in the page memory 9003 with the color multivalued image data stored therein (ST31). If there is the non-printed image data, the printing processing of the color multivalued image data is started (ST32).

Finally, when there is not the non-printed color multivalued image data in the step ST31, or after the printing processing of the step ST32 ends, the system controller 1 ends the copying operation.

As described above, according to the second embodiment, during copying of the plurality of drafts including the black-and-white and color drafts by the ADF, it is automatically judged whether the draft is the black-and-white or color draft without deteriorating the productivity of black-and-white copying. The respective optimum black-and-white printing sequence and color printing sequence by the flat bed reading can be performed.

Moreover, the user can thereby perform high-productivity copying by the appropriate printing sequence without noticing the type of black-and-white and/or color of the draft.

A third embodiment will next be described.

In the third embodiment, main scanning is performed with black-and-white during sheet through reading, the data is stored in the page memory, and color pre-scanning is simultaneously performed. During pre-scanning, an achromatic region is identified and a region attribute is stored. With black-and-white (achromatic color) the image data stored in the page memory is outputted. With color (chromatic color), the black-and-white main scanning and the color main scanning are simultaneously performed by the flat bed reading. The output is changed to the output of the black-and-white sensor for the achromatic region, and to the output of the color sensor for other regions based on previously stored achromatic region information.

That is, according to the third embodiment, there is provided an image reading apparatus in which the four lines CCD sensor is used. The black-and-white draft is read by the black-and-white sensor and the image data stored in the page memory is outputted. Moreover, with the color draft, the image data from the black-and-white sensor is outputted for the achromatic region by the achromatic region information, and a plurality of pieces of image data from the RGB color sensor are outputted for the color region. The output is switched with the region in the page in this manner, and a high-quality read image is obtained.

First, when the draft on the ADF 17 is fed to the draft base 205, the sheet through reading is performed by moving the draft while fixing the reading position in the reading position (a) shown in FIG. 2. The black-and-white multivalued image data read by the Y sensor 20y is stored in the black-and-white multivalued page memory 9002.

Moreover, during the sheet through reading by the Y sensor 20y, the R sensor 20r, G sensor 20g, and B sensor 20b simultaneously read the color image at the ¼ resolution of the main scanning resolution by the sheet through reading. The color region identification section 8004 outputs the color region judgment result (Sc) based on the read color image data (R, G, B). The color region judgment result (Sc) from the color region identification section 8004 is stored in the page memory 9005 of the color region identification data.

Moreover, the black-and-white and/or color page judgment section 9012 totals the color region judgment results (Sc) from the color region identification section 8004 by the page unit, and judges whether the read page is the black-and-white draft or the color draft. Therefore, the black-and-white and/or color judgment of the page is completed simultaneously with the sheet through reading of the black-and-white multivalued image.

When black-and-white is judged as the black-and-white and/or color judgment result of the page, the black-and-white multivalued image data stored in the black-and-white multivalued page memory 9002 is transmitted to the printer 30, and the printing operation of the black-and-white single-color image is performed.

When the color is judged as the black-and-white and/or color judgment result of the page, the Y sensor 20y, R sensor 20r, G sensor 20g, B sensor 20b simultaneously read the color draft on the draft base 205 at the ¼ speed of the black-and-white reading speed by the flat bed reading by the reading position movement. Moreover, the outputs of the R sensor 20r, G sensor 20g, B sensor 20b are outputted for the color region, and the output of the Y sensor 20y is outputted for the achromatic region as the read image data based on the color region judgment result (Sc) stored in the page memory 9005.

Figure 12:
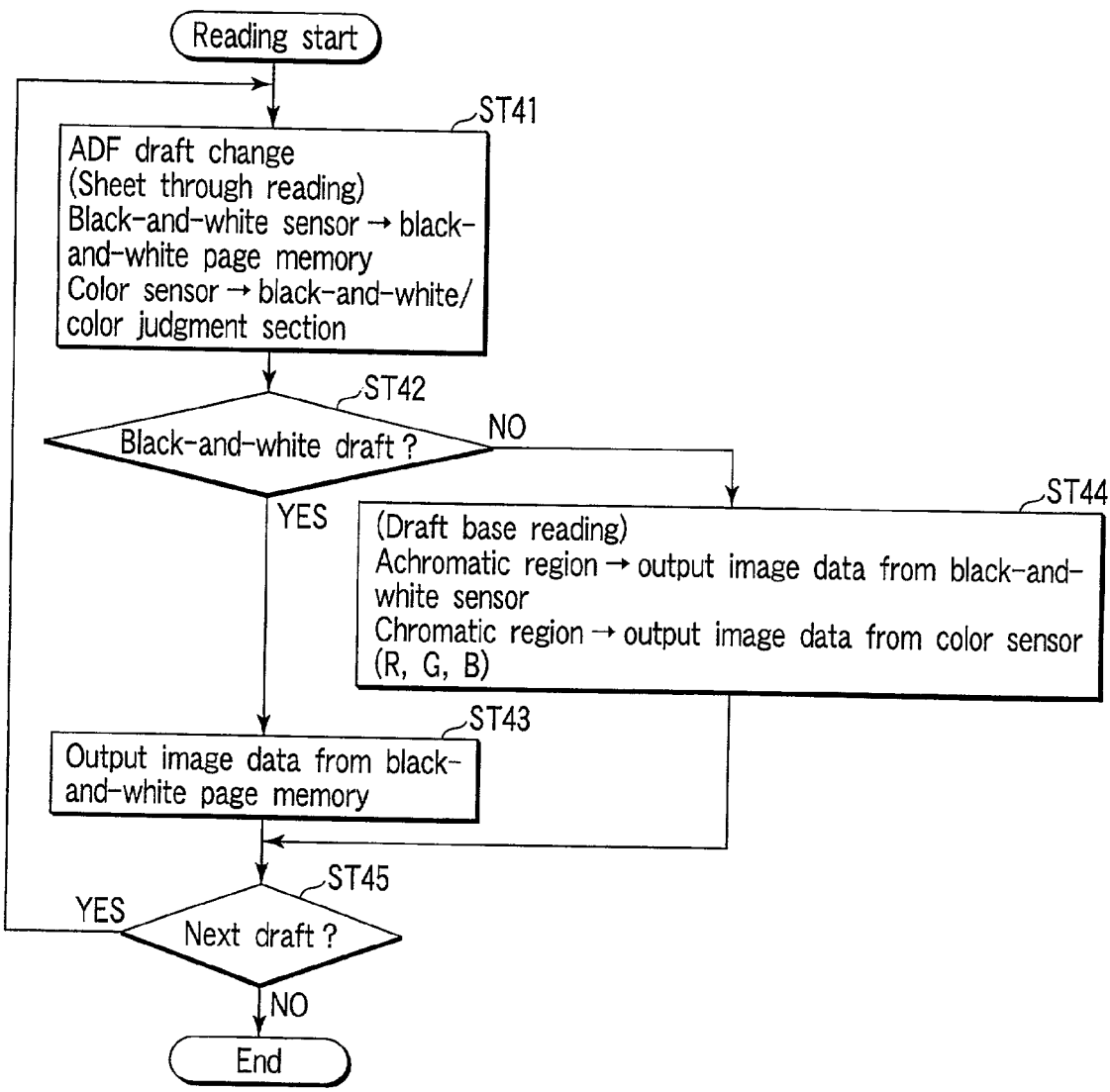
FIG. 12 is a flowchart showing a reading operation of a third embodiment.

The reading operation of the third embodiment will next be described with reference to a flowchart of FIG. 12.

First, when the user I/F section 6 instructs the system controller 1 to start copying, the controller performs the sheet through reading by the ADF 17. In this case, the system controller 1 reads the draft by the Y sensor 20y, and stores the black-and-white multivalued image data in the page memory 9002 (ST41).

Moreover, the system controller 1 simultaneously reads the draft by the R sensor 20r, G sensor 20g, and B sensor 20b as the color sensors by the sheet through reading (the resolution is reduced to ¼). The controller identifies the color region from the read R, G, B signals by the color region identification section 8004, and stores the color region judgment result (Sc) in the page memory 9005 (ST41).

The system controller 1 uses the black-and-white and/or color page judgment section 9012 to judge whether or not the draft is the black-and-white draft from the color region judgment result (Sc) identified by the color region identification section 8004 (ST42).

When the draft is the black-and-white draft, the system controller 1 outputs the black-and-white multivalued image data stored in the page memory 9002 (ST43).

Moreover, when the draft is not the black-and-white draft in the step ST42, the system controller 1 uses the Y sensor 20y, R sensor 20r, G sensor 20g, B sensor 20b to read the color draft on the draft base 205 by the flat bed reading by the reading position movement (at the ¼ speed of the black-and-white reading speed).

Furthermore, the system controller 1 outputs the image data (Bk) from the Y sensor 20y for the achromatic region and image data (R, G, B) from the R sensor 20r, G sensor 20g, B sensor 20b for the chromatic region based on the color region judgment result (Sc) of the page memory 9005 stored during the sheet through reading (ST44).

After the output end of the step ST43, or after the output end of the step ST44, the system controller 1 checks whether or not there is the next draft (ST45). When there is the next draft, the flow returns to the step ST41. When there is not the next draft, the reading ends.

As described above, according to the third embodiment, during reading of a plurality of drafts including black-and-white and color drafts by the ADF, the black-and-white or color draft is automatically judged without deteriorating the productivity of black-and-white copying. With the black-and-white draft, the high-quality read image data (Bk) read by the high-speed sensor for exclusive use in black-and-white is outputted. With the color draft, the high-quality read image data (Bk, R, G, B) read by the sensors for exclusive use in the respective black-and-white and color regions can be outputted.

Additionally, when a reading level of the black-and-white image may be binary, the image data stored in the black-and-white binary page memory can similarly be utilized instead of the image data stored in the black-and-white multivalued page memory.

A fourth embodiment will next be described.

In the fourth embodiment, black-and-white main scanning is performed during sheet through reading, the data is stored in the page memory, and color pre-scanning is simultaneously performed. During pre-scanning, the achromatic region is identified and the region attribute is stored. With the black-and-white region the image data stored in the page memory is outputted. With the color region the color main scanning is performed by the flat bed reading. The previously stored image data of the black-and-white page memory is outputted for the achromatic region, and the output is changed to the output from the color sensor for the other regions based on the previously stored achromatic region information.

That is, according to the fourth embodiment, there is provided the image reading apparatus in which the four lines CCD sensor is used. The black-and-white draft is read by the black-and-white sensor and the image data stored in the page memory is outputted. Moreover, with the color draft, the image data stored in the page memory is outputted for the achromatic region by the color region information, and a plurality of pieces of image data from the RGB color sensor are outputted for the color region. The output is switched with the region in the page in this manner, and the high-quality read image is obtained.

Figure 13:
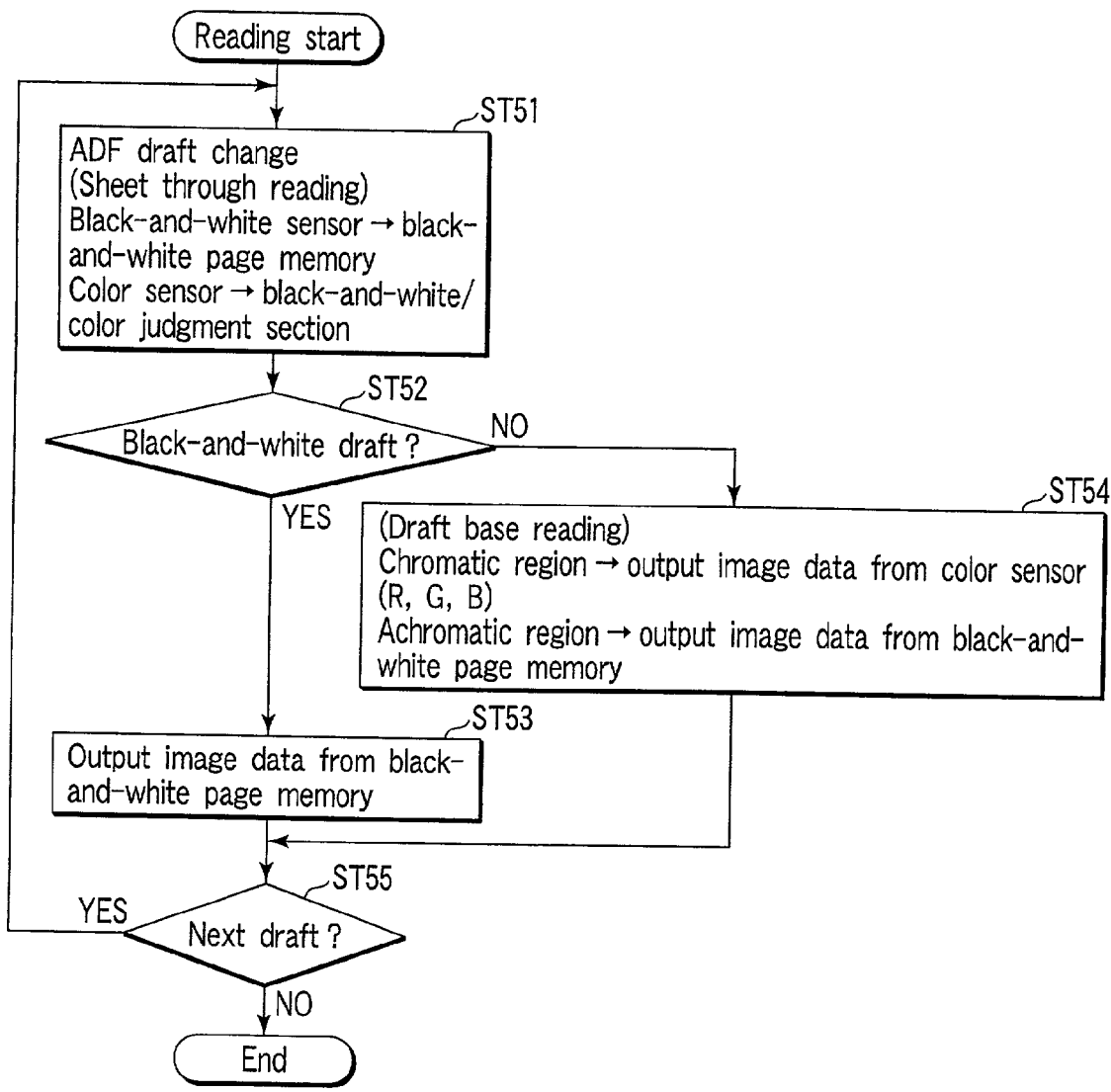
FIG. 13 is a flowchart showing the reading operation of a fourth embodiment.

The reading operation of the fourth embodiment will next be described with reference to a flowchart of FIG. 13.

First, when the user I/F section 6 instructs the system controller 1 to start copying, the controller performs the sheet through reading by the ADF 17. In this case, the system controller 1 reads the draft by the Y sensor 20y, and stores the black-and-white multivalued image data in the page memory 9002 (ST51).

Moreover, the system controller 1 simultaneously reads the draft by the R sensor 20r, G sensor 20g, and B sensor 20b as the color sensors by the sheet through reading (the resolution is reduced to ¼). The controller identifies the color region from the read R, G, B signals by the color region identification section 8004 (ST51).

The system controller 1 uses the black-and-white and/or color page judgment section 9012 to judge whether or not the draft is the black-and-white draft from the color region judgment result (Sc) identified by the color region identification section 8004 (ST52).

When the draft is the black-and-white draft, the system controller 1 outputs the black-and-white multivalued image data stored in the page memory 9002 (ST53).

Moreover, when the draft is not the black-and-white draft in the step ST52, the system controller 1 uses the R sensor 20r, G sensor 20g, B sensor 20b to read the color draft on the draft base 205 by the flat bed reading by the reading position movement (at the ¼ speed of the black-and-white reading speed).

Furthermore, the system controller 1 outputs the black-and-white multivalued image data stored in the page memory 9002 for the achromatic region and image data (R, G, B) from the R sensor 20r, G sensor 20g, B sensor 20b for the chromatic region based on the color region identification data of the page memory 9005 stored during the sheet through reading (ST54).

After the output end of the step ST53, or after the output end of the step ST54, the system controller 1 judges whether or not there is the next draft (ST55). When there is the next draft, the flow returns to the step ST51. When there is not the next draft, the reading ends.

As described above, according to the fourth embodiment, during reading of the plurality of drafts including black-and-white and color drafts by the ADF, the black-and-white or color draft is automatically judged without deteriorating the productivity of black-and-white copying. With the black-and-white draft, the high-quality image data read by the high-speed black-and-white sensor and stored in the page memory is outputted. With the color draft, the high-quality image data (Bk) stored in the page memory is outputted for the black-and-white region, and the high-quality image data (R, G, B) read by the color sensor can be outputted for the color region.

Additionally, when the reading level of the black-and-white image may be binary, the image data stored in the black-and-white binary page memory can similarly be utilized instead of the image data stored in the black-and-white multivalued page memory.

A fifth embodiment will next be described.

In the fifth embodiment, the main scanning is performed with black-and-white during flat bed reading, the data is stored in the page memory, and the pre-scanning is simultaneously performed with the color. During the pre-scanning, the achromatic region is identified and the region attribute is stored. With the black-and-white (achromatic color) the image data stored in the page memory is outputted. With the color (chromatic color) the carriage is moved back, the black-and-white main scanning and color main scanning are simultaneously performed by the flat bed reading, and the output is changed to the output of the black-and-white sensor for the achromatic region and to the output of the color sensor for the other regions based on the previously stored achromatic region information.

That is, according to the fifth embodiment, there is provided the image reading apparatus in which the four lines CCD sensor is used. The black-and-white draft is read by the black-and-white sensor. With the color draft, the output is changed to the black-and-white sensor output for the achromatic region and to the RGB color sensor output for the color region by the achromatic region information in the page, and the high-quality read image is obtained.

Figure 14:
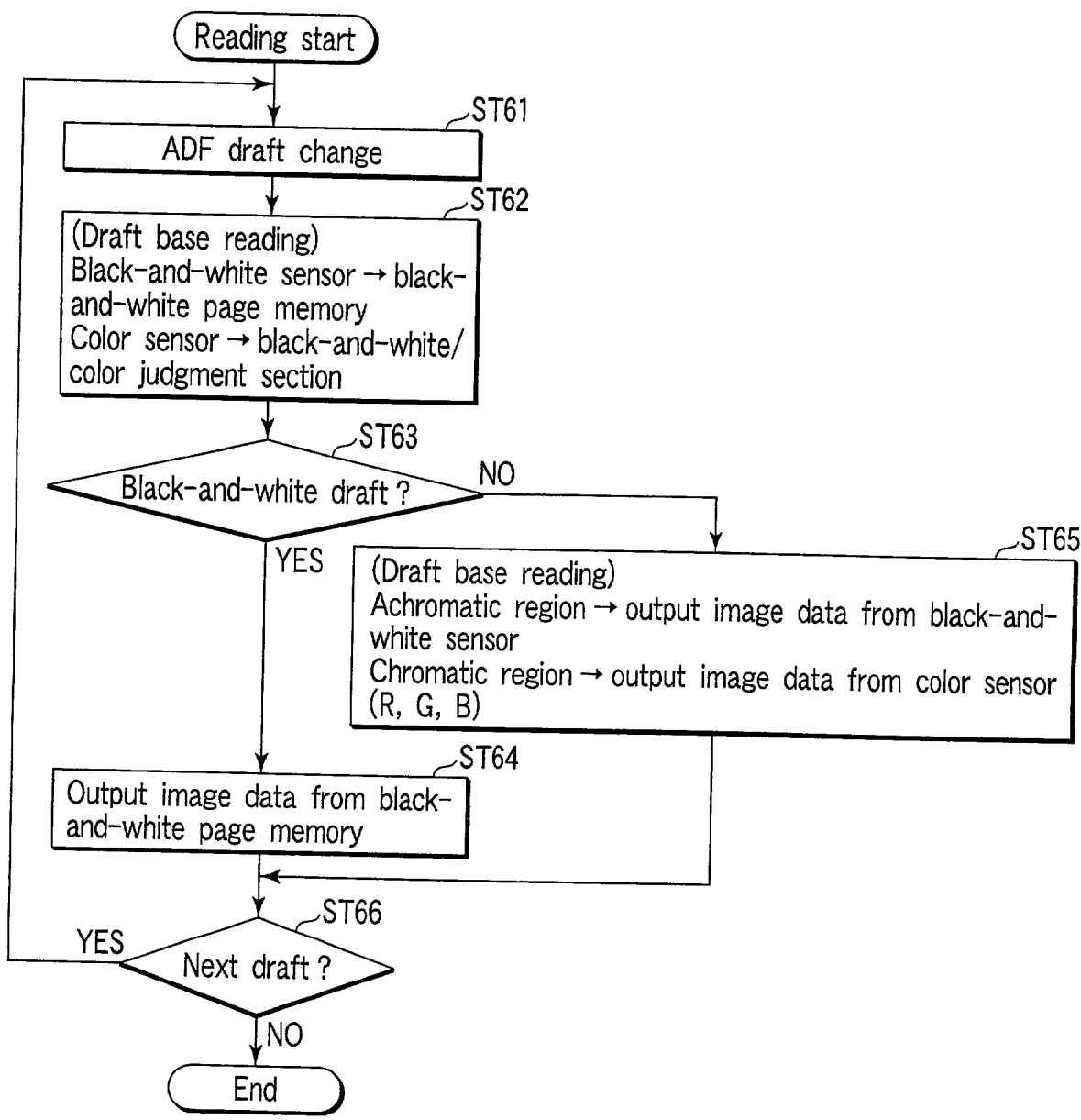
FIG. 14 is a flowchart showing the reading operation of a fifth embodiment.

The reading operation of the fifth embodiment will next be described with reference to a flowchart of FIG. 14.

First, when the user I/F section 6 instructs the system controller 1 to start copying, the controller performs the flat bed reading by the ADF 17 (ST61). In this case, the system controller 1 reads the draft by the Y sensor 20y, and stores the black-and-white multivalued image data in the page memory 9002 (ST62).

Moreover, the system controller 1 simultaneously reads the draft by the R sensor 20r, G sensor 20g, and B sensor 20b as the color sensors (the resolution is reduced to ¼). The controller identifies the color region from the read R, G, B signals by the color region identification section 8004, and stores the color region judgment result (Sc) in the page memory 9005 (ST62).

The system controller 1 uses the black-and-white and/or color page judgment section 9012 to judge whether or not the draft is the black-and-white draft from the color region judgment result (Sc) identified by the color region identification section 8004 (ST63).

When the draft is the black-and-white draft, the system controller 1 outputs the black-and-white multivalued image data stored in the page memory 9002 (ST64).

Moreover, when the draft is not the black-and-white draft in the step ST63, the system controller 1 uses the Y sensor 20y, R sensor 20r, G sensor 20g, B sensor 20b again to read the color draft on the draft base 205 by the flat bed reading by the reading position movement (at the ¼ speed of the black-and-white reading speed).

Furthermore, the system controller 1 outputs the image data (Bk) from the Y sensor 20y for the achromatic region and image data (R, G, B) from the R sensor 20r, G sensor 20g, B sensor 20b for the chromatic (color) region based on the color region judgment result (Sc) of the page memory 9005 stored during the first flat bed reading (ST65).

After the output end of the step ST64, or after the output end of the step ST65, the system controller 1 judges whether or not there is the next draft (ST66). When there is the next draft, the flow returns to the step ST61. When there is not the next draft, the reading ends.

As described above, according to the fifth embodiment, during reading of the plurality of drafts including black-and-white and color drafts by the ADF, the black-and-white or color draft is automatically judged without deteriorating the productivity of black-and-white copying. With the black-and-white draft, the high-quality read image data read by the high-speed sensor for exclusive use in black-and-white is outputted. With the color draft, the high-quality image data read by the respective sensors for exclusive use in the black-and-white region and color region can be obtained. The image reading apparatus can be realized in this manner.

Additionally, when the reading level of the black-and-white image may be binary, the image data stored in the black-and-white binary page memory can similarly be utilized instead of the image data stored in the black-and-white multivalued page memory.

A sixth embodiment will next be described.

In the sixth embodiment, the main scanning is performed with black-and-white during flat bed reading, the data is stored in the page memory, and the pre-scanning is simultaneously performed with the color. During the pre-scanning, the achromatic region is identified and the region attribute is stored. With the black-and-white (achromatic color) the image data stored in the page memory is outputted. With the color (chromatic color) the carriage is moved back, the color main scanning is performed by the flat bed reading, and the output is changed to the output of the image data stored in the page memory for the achromatic region and to the output of the color sensor for the other regions based on the previously stored achromatic region information.

Figure 15:
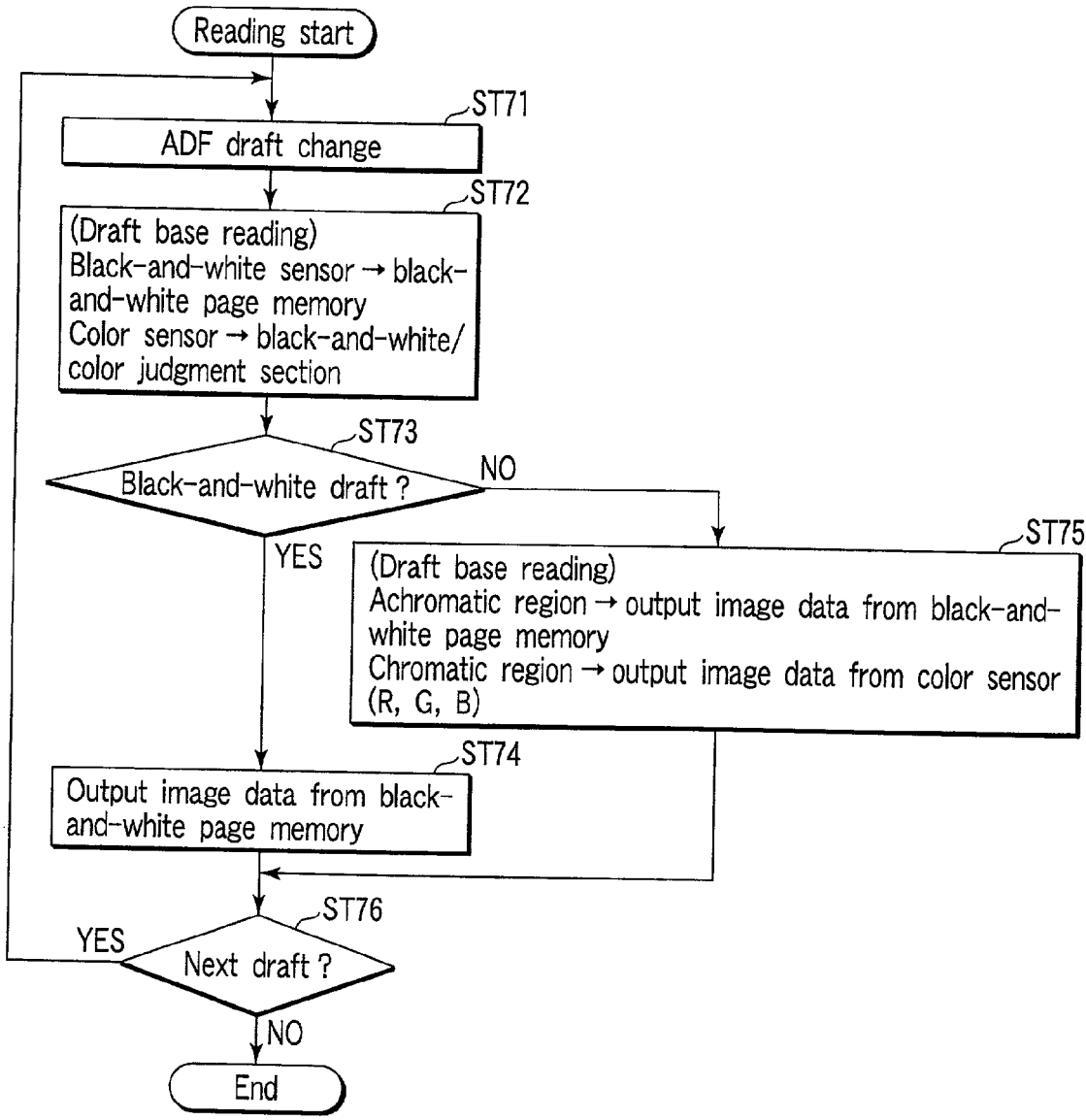
FIG. 15 is a flowchart showing the reading operation of a sixth embodiment.

The reading operation of the sixth embodiment will next be described with reference to a flowchart of FIG. 15.

First, when the user I/F section 6 instructs the system controller 1 to start copying, the controller performs the flat bed reading by the ADF 17 (ST71). In this case, the system controller 1 reads the draft by the Y sensor 20y, and stores the black-and-white multivalued image data in the page memory 9002 (ST72).

Moreover, the system controller 1 simultaneously reads the draft by the R sensor 20r, G sensor 20g, and B sensor 20b as the color sensors (the resolution is reduced to ¼). The controller identifies the color region from the read R, G, B signals by the color region identification section 8004, and stores the color region judgment result (Sc) in the page memory 9005 (ST72).

The system controller 1 uses the black-and-white and/or color page judgment section 9012 to judge whether or not the draft is the black-and-white draft from the color region judgment result (Sc) identified by the color region identification section 8004 (ST73).

When the draft is the black-and-white draft, the system controller 1 outputs the black-and-white multivalued image data stored in the page memory 9002 (ST74).

Moreover, when the draft is not the black-and-white draft in the step ST73, the system controller 1 uses the R sensor 20r, G sensor 20g, B sensor 20b again to read the color draft on the draft base 205 by the flat bed reading by the reading position movement (at the ¼ speed of the black-and-white reading speed).

Furthermore, the system controller 1 outputs the black-and-white multivalued image data stored in the page memory 9002 for the achromatic region and image data (R, G, B) from the R sensor 20r, G sensor 20g, B sensor 20b for the chromatic (color) region based on the color region judgment result (Sc) of the page memory 9005 stored during the first flat bed reading (ST75).

After the output end of the step ST74, or after the output end of the step ST65, the system controller 1 judges whether or not there is the next draft (ST76). When there is the next draft, the flow returns to the step ST71. When there is not the next draft, the reading ends.

As described above, according to the sixth embodiment, during reading of the plurality of drafts including black-and-white and color drafts by the ADF, the black-and-white or color draft is automatically judged without deteriorating the productivity of copying. With the black-and-white draft, the high-quality read image data read by the high-speed sensor for exclusive use in black-and-white and stored in the page memory is outputted. With the color draft, the image data stored in the page memory is outputted for the black-and-white region, and the image data read by the color sensor is outputted for the color region, so that the high-quality read image can be obtained.

Additionally, when the reading level of the black-and-white image may be binary, the image data stored in the black-and-white binary page memory can similarly be utilized instead of the image data stored in the black-and-white multivalued page memory.

A seventh embodiment will next be described.

In the seventh embodiment, the main scanning is performed with black-and-white and the image data is stored in the page memory. Additionally, the color main scanning is performed at a low resolution and the image data is stored in the color page memory. During the color main scanning, the photograph region is identified. The image data obtained by trimming the high-resolution black-and-white image data with the photograph region, and the image data obtained by masking the low-resolution color image data with the photograph region are outputted.

That is, according to the seventh embodiment, there is provided the image reading apparatus using the four lines CCD sensor. The black-and-white draft is read by the black-and-white sensor and stored in the page memory. With the color draft, the output is changed to the black-and-white sensor output for a non-photograph region and to the RGB color sensor output for the photograph region in the page by the photograph region information, and the high-quality read image is obtained.

Figure 16:
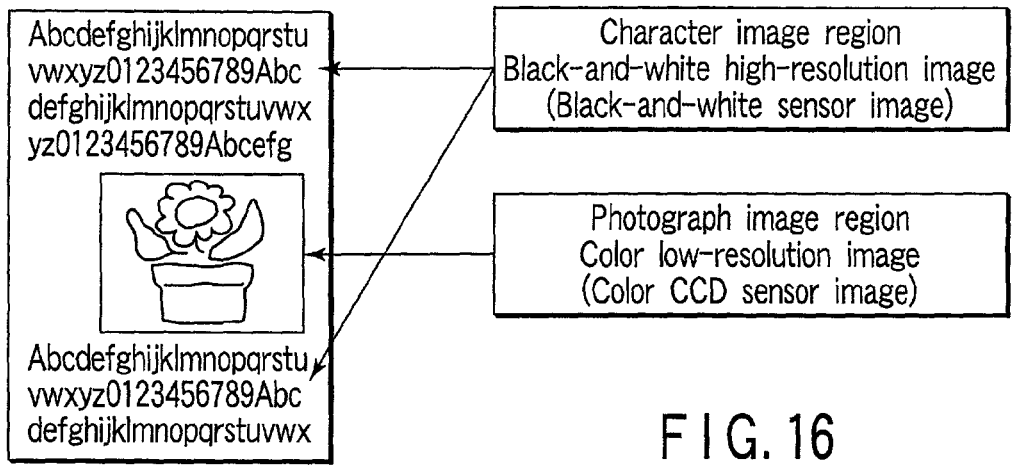
FIG. 16 is a diagram showing a seventh embodiment.

The seventh embodiment will next be described with reference to FIGS. 16, 17, 18, 19. It is here assumed that the draft shown in FIG. 16 is read.

First, when the draft on the ADF 17 is fed to the draft base 205, the sheet through reading is performed by moving the draft while fixing the reading position in the reading position (a) shown in FIG. 2. The black-and-white multivalued image data read by the Y sensor 20y is stored in the black-and-white multivalued page memory 9002.

Moreover, during the sheet through reading by the Y sensor 20y, the R sensor 20r, G sensor 20g, and B sensor 20b simultaneously read the color image at the ¼ resolution of the main scanning resolution by the sheet through reading. The color multivalued image data read by the R sensor 20r, G sensor 20g, B sensor 20b is stored in the color multivalued page memory 9003.

Figure 17:
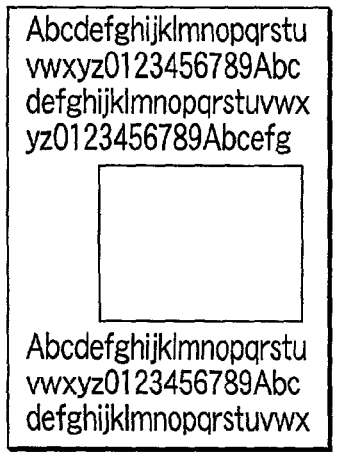
FIG. 17 is a diagram showing the seventh embodiment.
Figure 18:
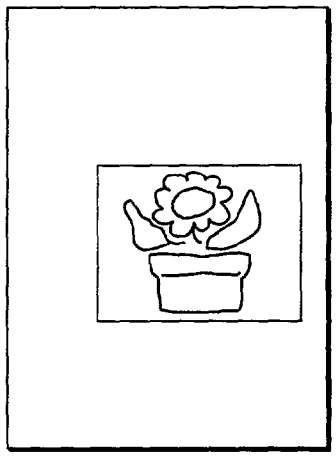
FIG. 18 is a diagram showing the seventh embodiment.

As the image reading result, the black-and-white multivalued image data trimmed with the photograph region as shown in FIG. 17 is stored in the page memory 9002, and the color multivalued image data masked with the photograph region as shown in FIG. 18 is stored in the page memory 9003.

Figure 19:
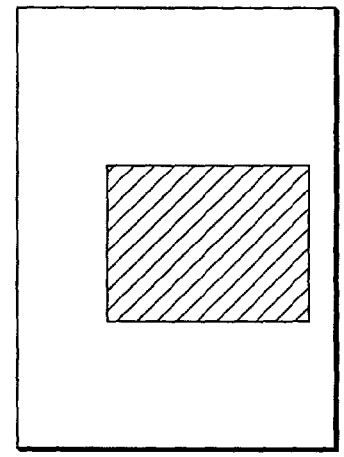
FIG. 19 is a diagram showing the seventh embodiment.

Moreover, the photograph region identification section 8003 outputs a photograph region judgment result (Sp) based on the respective image data from the Y sensor 20y, R sensor 20r, G sensor 20g, and B sensor 20b, and the data of the photograph region judgment result shown in FIG. 19 is stored in the page memory 9004.

When these image data are utilized, the black-and-white multivalued image data trimmed with the photograph region and the color multivalued image data masked with the photograph region are synthesized. The read image can be obtained with the black-and-white high-resolution image in the non-photograph region and with the low-resolution color image in the photograph region.

As described above, according to the seventh embodiment, a photograph portion which does not require the high resolution is read by the color sensor at the low resolution. Thereby, the low-resolution color image is read simultaneously with the high-resolution reading of the black-and-white image, and the photograph image can be read by the color sensor at the same speed as the black-and-white reading speed.

Moreover, when the reading level of the black-and-white image may be binary, the image data stored in the black-and-white binary page memory 9001 can similarly be used instead of the image data stored in the black-and-white multivalued page memory 9002.

An eighth embodiment will next be described.

In the eighth embodiment, the main scanning is performed with black-and-white and the image data is stored in the page memory. Additionally, the color main scanning is performed at a low resolution and the image data is stored in the color page memory. During the color main scanning, the photograph region is identified, and high-resolution black-and-white image data, low-resolution color image data, and photograph region information are outputted.

The eighth embodiment will next be described with reference to FIGS. 16, 20, 21, 22. It is here assumed that the draft shown in FIG. 16 is read.

First, when the draft on the ADF 17 is fed to the draft base 205, the sheet through reading is performed by moving the draft while fixing the reading position in the reading position (a) shown in FIG. 2. The black-and-white multivalued image data read by the Y sensor 20y and shown in FIG. 20 is stored in the black-and-white multivalued page memory 9002.

Moreover, during the sheet through reading by the Y sensor 20y, the R sensor 20r, G sensor 20g, and B sensor 20b simultaneously read the color image at the ¼ resolution of the main scanning resolution by the sheet through reading. The color multivalued image data read by the R sensor 20r, G sensor 20g, B sensor 20b and shown in FIG. 21 is stored in the color multivalued page memory 9003.

Figure 22:
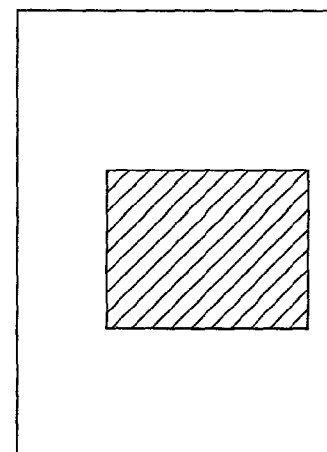
FIG. 22 is a diagram showing the eighth embodiment.

Moreover, the photograph region identification section 8003 outputs the photograph region judgment result (Sp) based on the respective image data from the Y sensor 20y, R sensor 20r, G sensor 20g, and B sensor 20b, and the data of the photograph region judgment result shown in FIG. 22 is stored in the page memory 9004.

Figure 20:
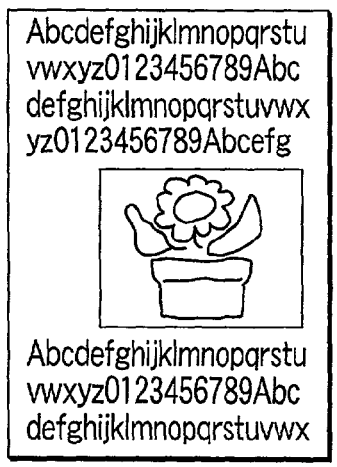
FIG. 20 is a diagram showing an eighth embodiment.
Figure 21:
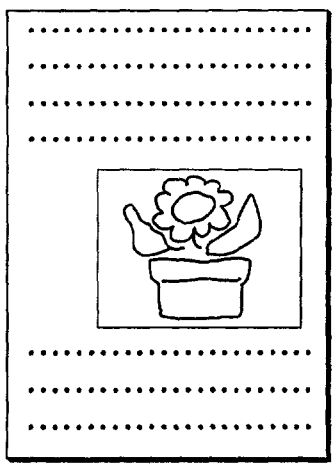
FIG. 21 is a diagram showing the eighth embodiment.

As described above, for the image reading result, the black-and-white multivalued image data shown in FIG. 20, the color multivalued image data shown in FIG. 21, and the photograph region information shown in FIG. 22 are outputted.

When these image data are utilized, the black-and-white multivalued image data and color multivalued image data are synthesized based on the photograph region information. The read image can thus be obtained with the black-and-white high-resolution image in the non-photograph region and with the low-resolution color image in the photograph region.

As described above, according to the eighth embodiment, the photograph portion which does not require the high resolution is read by the color sensor at the low resolution. Thereby, the low-resolution color image is read simultaneously with the high-resolution reading of the black-and-white image, and the photograph image can be read by the color sensor at the same speed as the black-and-white reading speed.

Moreover, when the reading level of the black-and-white image may be binary, the image data stored in the black-and-white binary page memory 9001 can similarly be used instead of the image data stored in the black-and-white multivalued page memory 9002.

A ninth embodiment will next be described.

In the ninth embodiment, the main scanning is performed with black-and-white and the image data is stored in the black-and-white page memory. Additionally, the color main scanning is performed and the image data is stored in the color page memory. The image data stored in the respective page memories is selectively outputted based on the black-and-white and/or color judgment result of the page unit.

That is, in the ninth embodiment, there is provided the image reading apparatus in which the four lines CCD sensor is used. The black-and-white draft is read by the black-andwhite sensor. The output is changed to the black-and-white sensor output for the black-and-white draft and to the RGB color sensor output for the color draft by the page unit based on the black-and-white and/or color judgment result, and the high-quality read image is obtained. Additionally, in the four lines CCD sensor of the present embodiment, both the black-and-white sensor and the color sensor can read the draft at the same resolution in the same reading speed.

First, when the draft on the ADF 17 is fed to the draft base 205, the flat bed reading is performed. The black-and-white multivalued image data read by the Y sensor 20$y$ is stored in the black-and-white multivalued page memory 9002, and the color multivalued image data (R, G, B) read by the R sensor 20$r$, G sensor 20$g$, B sensor 20$b$ are stored in the color multivalued page memory 9003.

The color region identification section 8004 outputs the color region judgment result (Sc) based on the read color multivalued image data (R, G, B). The color region judgment result (Sc) from the color region identification section 8004 is stored in the page memory 9005 of the color region identification data.

Moreover, the black-and-white and/or color page judgment section 9012 totals the color region judgment results (Sc) from the color region identification section 8004 by the page unit, and judges whether the read page is the black-and-white draft or the color draft.

When the black-and-white is judged as the black-and-white and/or color judgment result of the page, the black-and-white multivalued image data stored in the black-and-white multivalued page memory 9002 is outputted.

When the color is judged as the black-and-white and/or color judgment result of the page, the color multivalued image data stored in the color multivalued page memory 9003 is outputted.

As described above, according to the ninth embodiment, during reading of the plurality of drafts including black-and-white and color drafts by the ADF, with the black-and-white draft, the black-and-white multivalued image data stored in the black-and-white multivalued page memory 9002 is outputted. With the color draft, the color multivalued image data stored in the color multivalued page memory 9003 is outputted. Since the output is changed by the page unit, the high-quality read image can be outputted.

Moreover, when the reading level of the black-and-white image may be binary, the image data stored in the black-and-white binary page memory 9001 can similarly be used instead of the image data stored in the black-and-white multivalued page memory 9002.

A tenth embodiment will next be described.

In the tenth embodiment, one color necessary for forming the color image is generated from the color sensor signal simultaneously with the black-and-white reading. The four lines CCD sensor and black-and-white sensor of the present embodiment can read the image at the same resolution in the same reading speed.

First, when the draft on the ADF 17 is fed to the draft base 205, the sheet through reading is performed by moving the draft while fixing the reading position in the reading position (a) shown in FIG. 2. The black-and-white multivalued image data read by the Y sensor 20$y$ is processed into the black-and-white binary image data by the processor 8001, and stored in the black-and-white binary page memory 9001. Moreover, when there is a demand for two or more copies at the same time, the image data is managed and accumulated in the HDD 9015 by the page unit via the black-and-white binary CoDec 9011 and black-and-white binary code memory 9008. In this case, the black-and-white binary image data is read from the HDD 9015 for second and subsequent copies.

Furthermore, during the sheet through reading of the black-and-white image, the R sensor 20$r$, G sensor 20$g$, B sensor 20$b$ simultaneously read the color image (R, G, B). The color image data (RGB signal) is converted to the YMC signal by the color converter 8002 and outputted to the inking section 9013 via the page memory 9003. The inking section 9013 generates a yellow (Y) signal necessary for printing the color image from the inputted YMC signal. The generated Y signal is stored in the page memory 9002. Moreover, when there is a demand for two or more copies at the same time, the image data is managed and accumulated in the HDD 9015 by the page unit via the black-and-white multivalued CoDec 9010 and black-and-white multivalued code memory 9008. In this case, the Y signal is read from the HDD 9015 for second and subsequent copies.

The color region identification section 8004 outputs the color region judgment result (Sc) based on the read color image data (RGB signal). The color region judgment result (Sc) from the color region identification section 8004 is stored in the page memory 9005 of the color region identification data.

Moreover, the black-and-white and/or color page judgment section 9012 totals the color region judgment results (Sc) from the color region identification section 8004 by the page unit, and judges whether the read page is the black-and-white draft or the color draft. Therefore, the black-and-white and/or color judgment of the page is completed simultaneously with the sheet through reading of the black-and-white binary image.

When the black-and-white is judged as the black-and-white and/or color judgment result of the page, the black-and-white binary image data stored in the black-and-white binary page memory 9001 is transmitted to the printer 30, and the printing operation of the black-and-white single-color image is performed.

When the color is judged as the black-and-white and/or color judgment result of the page, the Y signal stored in the page memory 9002 is transmitted to the printer 30, and the printing operation of a first-color printed image is performed. Subsequently, the flat bed reading of the color draft is performed three times, and the M signal, C signal, then Bk signal necessary for printing the color image are generated by the inking section 9013 via the color converter 8002 and page memory 9003 as described above and transmitted to the printer 30. The printing operation for remaining three colors is performed.

A modification example of the tenth embodiment will next be described.

First, when the draft on the ADF 17 is fed to the draft base 205, the sheet through reading is performed by moving the draft while fixing the reading position in the reading position (a) shown in FIG. 2. The black-and-white multivalued image data read by the Y sensor 20$y$ is stored in the black-and-white multivalued page memory 9002. Moreover, when there is a demand for two or more copies at the same time, the image data is managed and accumulated in the HDD 9015 by the page unit via the black-and-white multivalued CoDec 9010 and black-and-white multivalued code memory 9007. In this case, the black-and-white multivalued image data is read from the HDD 9015 for the second and subsequent copies.

Furthermore, during the sheet through reading of the black-and-white multivalued image, the R sensor 20$r$, G sensor 20$g$, B sensor 20$b$ simultaneously read the color image (R, G, B). The color image data (RGB signal) is converted to the YMC signal by the color converter 8002 and outputted to the inking section 9013 via the page memory 9003. The inking section 9013 generates the yellow (Y) signal necessary for printing the color image from the inputted YMC signal. The generated Y signal is stored in the page memory 9002. Moreover, when there is a demand for two or more copies at the same time, the image data is managed and accumulated in the HDD 9015 by the page unit via the black-and-white multivalued CoDec 9010 and black-and-white multivalued code memory 9008. In this case, the Y signal is read from the HDD 9015 for the second and subsequent copies.

The color region identification section 8004 outputs the color region judgment result (Sc) based on the read color image data (R, G, B). The color region judgment result (Sc) from the color region identification section 8004 is stored in the page memory 9005 of the color region identification data.

Moreover, the black-and-white and/or color page judgment section 9012 totals the color region judgment results (Sc) from the color region identification section 8004 by the page unit, and judges whether the read page is the black-and-white draft or the color draft. Therefore, the black-and-white and/or color judgment of the page is completed simultaneously with the sheet through reading of the black-and-white binary image.

When the black-and-white is judged as the black-and-white and/or color judgment result of the page, the black-and-white multivalued image data stored in the black-and-white multivalued page memory 9002 is transmitted to the printer 30, and the printing operation of the black-and-white single-color image is performed.

When the color is judged as the black-and-white and/or color judgment result of the page, the Y signal stored in the page memory 9002 is transmitted to the printer 30, and the printing operation of the first-color printed image is performed. Subsequently, the flat bed reading of the color draft is performed twice, and the M signal, then C signal necessary for printing the color image are generated by the inking section 9013 via the color converter 8002 and page memory 9003 as described above and transmitted to the printer 30. The printing operation for two colors is performed. Finally, the black-and-white multivalued image data stored in the page memory 9002 is transmitted as the Bk signal necessary for printing the color image to the printer 30, and the printing operation is performed.

As described above, according to the tenth embodiment and modification example, during copying of the plurality of drafts including the black-and-white and color drafts by the ADF, it is automatically judged whether the draft is of black-and-white or color without deteriorating the productivity of black-and-white copying. The respective optimum black-and-white printing sequence and color printing sequence are performed. Thereby, the user can perform high-productivity copying by the appropriate printing sequence without noticing the type of black-and-white and/or color of the draft.

As described above, according to the embodiments of the present invention, since the four line colors CCD sensor is used, the reading speed of the black-and-white draft can be raised at a high precision.

Moreover, when the black-and-white and color drafts are intermingled and laid on the automatic draft feeder, the intermingled drafts of the black-and-white and color drafts can be copied without deteriorating the productivity of the black-and-white copying.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which has an automatic draft feeder for feeding a draft to a draft reading base and which reads an image of the draft and forms the image, said apparatus comprising:

an image reading section which includes a first line CCD sensor for reading the draft as a black-and-white image, and second, third, and fourth line CCD sensors for reading the draft as a color image;

a first controller which controls and uses said image reading section to read an entire surface of the draft by movement of the draft, when said automatic draft feeder feeds the draft to the draft reading base;

a storage section which stores black-and-white image data read by the first line CCD sensor under control by the first controller;

a judgment section which judges whether or not the draft is a black-and-white draft from color image data read by the second, third, and fourth line CCD sensors under control by said first controller; and a second controller which controls and moves a reading position of said image reading section and reads the entire surface of the draft fed onto said draft reading base, when the judgment section judges the draft not to be the black-and-white draft, wherein the black-and-white image is formed based on the image data stored in said storage section, when said judgment section judges the draft to be the black-and-white draft, and the color image is formed based on the color image data read by the second, third, and fourth line CCD sensors under control by said second controller, when said judgment section judges the draft not to be the black-and-white draft.

2. The image forming apparatus according to claim 1, wherein said first controller controls a sheet through reading in which the draft is moved and the entire surface of the draft is read by said image reading section.

3. The image forming apparatus according to claim 1, wherein said second controller controls a flat bed reading in which the draft is fixed to the draft reading base, the reading position of said image reading section is moved, and the entire surface of the draft is read.

4. The image forming apparatus according to claim 1, wherein said image reading section is a four lines CCD sensor in which the first line CCD sensor for reading the draft as the black-and-white image, and the second, third, and fourth line CCD sensors for reading the draft as the color image are contained in the same package.

5. An image forming apparatus which has an automatic draft feeder for feeding a draft to a draft reading base and which reads an image of the draft and forms the image, said apparatus comprising:

an image reading section which includes a first line CCD sensor for reading said draft as a black-and-white image, and second, third, and fourth line CCD sensors for reading the draft as a color image;

a first controller which controls and moves a reading position of said image reading section at a first speed and reads an entire surface of the draft fed to the draft reading base by said automatic draft feeder;

a storage section which stores black-and-white image data read by the first line CCD sensor under control by the first controller;

a judgment section which judges whether or not the draft is a black-and-white draft from color image data read by the second, third, and fourth line CCD sensors under control by said first controller; and a second controller which controls and moves the reading position of said image reading section at a second speed lower than said first speed and reads the entire surface of the draft fed onto said draft reading base, when the judgment section judges the draft not to be the black-and-white draft, wherein the black-and-white image is formed based on the image data stored in said storage section, when said judgment section judges the draft to be the black-and-white draft, and the color image is formed based on the color image data read by the second, third, and fourth line CCD sensors under control by said second controller, when said judgment section judges the draft not to be the black-and-white draft.

6. The image forming apparatus according to claim 5, wherein said first controller controls and moves the reading position of said image reading section at the first speed so that the first line CCD sensor in said image reading section reads the black-and-white image.

7. The image forming apparatus according to claim 5, wherein said second controller controls and moves the reading position of said image reading section at the second speed so that the second, third, and fourth line CCD sensors in said image reading section read the color image.

8. The image forming apparatus according to claim 5, wherein said image reading section is a four lines CCD sensor in which the first line CCD.

9. An image reading apparatus which has an automatic draft feeder for feeding a draft to a draft reading base and which reads an image of the draft, said apparatus comprising:

an image reading section which includes a first line CCD sensor for reading said draft as a black-and-white image, and second, third, and fourth line CCD sensors for reading the draft as a color image;

a first controller which controls and uses said image reading section to read an entire surface of the draft by movement of the draft, when said automatic draft feeder feeds the draft to the draft reading base;

a first storage section which stores black-and-white image data read by the first line CCD sensor under control by the first controller;

a region identification section which judges whether or not each region of the draft is achromatic based on color image data read by the second, third, and fourth line CCD sensors under control by said first controller;

a second storage section which stores an identification result of the region identification section;

a judgment section which totals the identification result of said region identification section by a page unit and judges whether or not the draft is a black-and-white draft; and a second controller which controls and moves a reading position of said image reading section and reads the entire surface of the draft fed onto said draft reading base, when the judgment section judges the draft not to be the black-and-white draft, wherein the image data stored in said first storage section is outputted, when said judgment section judges the draft to be the black-and-white draft, and the black-and-white image data read by the first line CCD sensor under control by said second controller is outputted in an achromatic region, and the color image data read by the second, third, and fourth line CCD sensors under control by the second controller is outputted in a non-achromatic region as the identification result of the draft stored in said second storage section, when said judgment section judges the draft not to be the black-and-white draft.

10. The image reading apparatus according to claim 9, wherein said region identification section judges whether or not a noted pixel in color draft data obtained by reading the draft is achromatic.

11. The image reading apparatus according to claim 9, wherein said image reading section is a four lines CCD sensor in which the first line CCD sensor for reading the draft as the black-and-white image, and the second, third, and fourth line CCD sensors for reading the draft as the color image are contained in the same package.

12. An image reading apparatus which has an automatic draft feeder for feeding a draft to a draft reading base and which reads an image of the draft, said apparatus comprising:

an image reading section which includes a first line CCD sensor for reading said draft as a black-and-white image, and second, third, and fourth line CCD sensors for reading the draft as a color image;

a first controller which controls and moves a reading position of said image reading section at a first speed and reads an entire surface of the draft fed to the draft reading base by said automatic draft feeder;

a first storage section which stores black-and-white image data read by the first line CCD sensor under control by the first controller;

a region identification section which judges whether or not each region of the draft is achromatic based on color image data read by the second, third, and fourth line CCD sensors under control by said first controller;

a second storage section which stores an identification result of the region identification section;

a judgment section which totals the identification result of said region identification section by a page unit and judges whether or not the draft is a black-and-white draft; and a second controller which controls and moves the reading position of said image reading section at a second speed lower than said first speed and reads the entire surface of the draft, when the judgment section judges the draft not to be the black-and-white draft, wherein the image data stored in said first storage section is outputted, when said judgment section judges the draft to be the black-and-white draft, and the black-and-white image data read by the first line CCD sensor under control by said second controller is outputted in an achromatic region, and the color image data read by the second, third, and fourth line CCD sensors under control by said second controller is outputted in a non-achromatic region as the identification result of the draft stored in said second storage section, when said judgment section judges the draft not to be the black-and-white draft.

13. The image reading apparatus according to claim 12, wherein said image reading section is a four lines CCD sensor in which the first line CCD sensor for reading the draft as the black-and-white image, and the second, third, and fourth line CCD sensors for reading the draft as the color image are contained in the same package.

14. An image reading apparatus which has an automatic draft feeder for feeding a draft to a draft reading base and which reads an image of the draft, said apparatus comprising:
an image reading section which includes a first line CCD sensor for reading said draft as a black-and-white image, and second, third, and fourth line CCD sensors for reading the draft as a color image;
a first controller which controls and moves a reading position of said image reading section at a first speed and reads an entire surface of the draft fed to the draft reading base by said automatic draft feeder;
a first storage section which stores black-and-white image data read by the first line CCD sensor under control by the first controller;
a region identification section which judges whether or not each region of the draft is achromatic based on color image data read by the second, third, and fourth line CCD sensors under control by said first controller;
a second storage section which stores an identification result of the region identification section;
a judgment section which totals the identification result of said region identification section by a page unit and judges whether or not the draft is a black-and-white draft; and
a second controller which controls and moves the reading position of said image reading section at a second speed lower than said first speed and reads the entire surface of the draft, when the judgment section judges the draft not to be the black-and-white draft,
wherein the image data stored in said first storage section is outputted, when said judgment section judges the draft to be the black-and-white draft, and
the black-and-white image data stored in said first storage section is outputted in an achromatic region, and the color image data read by the second, third, and fourth line CCD sensors under control by said second controller is outputted in a non-achromatic region as the identification result of the draft stored in said second storage section, when said judgment section judges the draft not to be the black-and-white draft.

15. The image reading apparatus according to claim 14, wherein said image reading section is a four lines CCD sensor in which the first line CCD sensor for reading the draft as the black-and-white image, and the second, third, and fourth line CCD sensors for reading the draft as the color image are contained in the same package.

16. An image reading apparatus which has an automatic draft feeder for feeding a draft to a draft reading base and which reads an image of the draft, said apparatus comprising:
an image reading section which includes a first line CCD sensor for reading said draft as a black-and-white image, and second, third, and fourth line CCD sensors for reading the draft as a color image;
a controller which controls and uses said image reading section to read an entire surface of the draft by movement of the draft, when said automatic draft feeder feeds the draft to the draft reading base;
a first storage section which stores black-and-white image data read by the first line CCD sensor under control by the controller;
a second storage section which stores color image data read by the second, third, and fourth line CCD sensors under control by said controller;
a photograph region identification section which identifies a photograph region of the draft based on the color image data read by the first, second, third, and fourth line CCD sensors under control by said controller;
a third storage section which stores photograph region identification information of the photograph region identification section; and
an output section which outputs black-and-white image data constituted by deleting the photograph region from the black-and-white image data stored in said first storage section, and color image data constituted by deleting regions other than the photograph region from the color image data stored in said second storage section as image information of the draft based on the black-and-white image data stored in said first storage section, the color image data stored in said second storage section, and the photograph region identification information stored in said third storage section.

17. The image reading apparatus according to claim 16, wherein said image reading section is a four lines CCD sensor in which the first line CCD sensor for reading the draft as the black-and-white image, and the second, third, and fourth line CCD sensors for reading the draft as the color image are contained in the same package.

18. An image reading apparatus which has an automatic draft feeder for feeding a draft to a draft reading base and which reads an image of the draft, said apparatus comprising:
an image reading section which includes a first line CCD sensor for reading said draft as a black-and-white image, and second, third, and fourth line CCD sensors for reading the draft as a color image;
a controller which controls and uses said image reading section to read an entire surface of the draft by movement of the draft, when said automatic draft feeder feeds the draft to the draft reading base;
a first storage section which stores black-and-white image data read by the first line CCD sensor under control by the controller;
a second storage section which stores color image data read by the second, third, and fourth line CCD sensors under control by said controller;
a photograph region identification section which identifies a photograph region of the draft based on the color image data read by the first, second, third, and fourth line CCD sensors under control by said controller;
a third storage section which stores photograph region identification information of the photograph region identification section; and
an output section which outputs black-and-white image data stored in said first storage section in a non-photograph region of the draft, and color image data constituted by deleting regions other than the photograph region from the color image data stored in said second storage section in the photograph region of the draft as image information of the draft based on the photograph region identification information stored in said third storage section.

19. The image reading apparatus according to claim 18, wherein said image reading section is a four lines CCD sensor in which the first line CCD sensor for reading the draft as the black-and-white image, and the second, third, and fourth line CCD sensors for reading the draft as the color image are contained in the same package.

20. An image reading apparatus which has an automatic draft feeder for feeding a draft to a draft reading base and which reads an image of the draft, said apparatus comprising:

an image reading section which includes a first line CCD sensor for reading said draft as a black-and-white image, and second, third, and fourth line CCD sensors for reading the draft as a color image;

a controller which controls and uses said image reading section to read an entire surface of the draft by movement of the draft, when said automatic draft feeder feeds the draft to the draft reading base;

a first storage section which stores black-and-white image data read by the first line CCD sensor under control by the controller;

a second storage section which stores color image data read by the second, third, and fourth line CCD sensors under control by said controller;

a photograph region identification section which identifies a photograph region of the draft based on the color image data read by the first, second, third, and fourth line CCD sensors under control by said controller;

a third storage section which stores photograph region identification information of the photograph region identification section; and an output section which outputs black-and-white image data stored in said first storage section, the color image data stored in said second storage section, and the photograph region identification information stored in said third storage section as image information of the draft.

21. The image reading apparatus according to claim 20, wherein said image reading section is a four lines CCD sensor in which the first line CCD sensor for reading the draft as the black-and-white image, and the second, third, and fourth line CCD sensors for reading the draft as the color image are contained in the same package.

22. An image forming apparatus which has an automatic draft feeder for feeding a draft to a draft reading base and which reads an image of the draft and forms the image, said apparatus comprising:

an image reading section which includes a first line CCD sensor for reading said draft as a black-and-white image, and second, third, and fourth line CCD sensors for reading the draft as a color image;

a first controller which controls and uses said image reading section to read an entire surface of the draft by movement of the draft, when said automatic draft feeder feeds the draft to the draft reading base;

a first storage section which stores black-and-white image data read by the first line CCD sensor under control by the first controller;

a first generation section which generates a first color signal necessary for forming the color image from color image data read by the second, third, and fourth line CCD sensors under control by said first controller;

a second storage section which stores the first color signal generated by the first generation section; and a judgment section which judges whether or draft is a black-and-white draft from the color data read by the second, third, and fourth line sensors under control by said first controller, wherein the black-and-white image is formed based on the image data stored in said first storage section, when said judgment section judges the draft to be the black-and-white draft, an image is formed based on the first color signal stored in said second storage section, when said judgment section judges the draft not to be the black-and-white draft, subsequently a control for moving a reading position of said image reading section and reading the entire surface of the draft fed to said draft reading base is performed three times, a second color signal is generated and an image is formed based on the second color signal for a first time, a third color signal is generated and an image is formed based on the third color signal for a second time, and a fourth color signal is generated and an image is formed based on the fourth color signal for a third time from the color image data read again by said second, third, and fourth line CCD sensors, and the color image is formed.

23. The image forming apparatus according to claim 22, wherein said image reading section is a four lines CCD sensor in which the first line CCD sensor for reading the draft as the black-and-white image, and the second, third, and fourth line CCD sensors for reading the draft as the color image are contained in the same package.

24. An image forming apparatus which has an automatic draft feeder for feeding a draft to a draft reading base and which reads an image of the draft and forms the image, said apparatus comprising:

an image reading section which includes a first line CCD sensor for reading said draft as a black-and-white image, and second, third, and fourth line CCD sensors for reading the draft as a color image;

a first controller which controls and uses said image reading section to read an entire surface of the draft by movement of the draft, when said automatic draft feeder feeds the draft to the draft reading base;

a first storage section which stores black-and-white image data read by the first line CCD sensor under control by the first controller;

a first generation section which generates a first color signal necessary for forming the color image from color image data read by the second, third, and fourth line CCD sensors under control by said first controller;

a second storage section which stores the first color signal generated by the first generation section; and a judgment section which judges whether or not the draft is a black-and-white draft from the color image data read by the second, third, and fourth line CCD sensors under control by said first controller, wherein the black-and-white image is formed based on the image data stored in said first storage section, when said judgment section judges the draft to be the black-and-white draft, an image is formed based on the first color signal stored in said second storage section, when said judgment section judges the draft not to be the black-and-white draft, subsequently a control for moving a reading position of said image reading section and reading the entire surface of the draft fed to said draft reading base is performed twice, a second color signal is generated and an image is formed based on the second color signal for a first time, and a third color signal is generated and an image is formed based on the third color signal for a second time from the color image data read again by said second, third, and fourth line CCD sensors, and the color image is formed. sensor for reading the draft as the black-and-white image, and the second, third, and fourth line CCD sensors for reading the draft as the color image are contained in the same package.

25. The image forming apparatus according to claim 24, wherein said image reading section is a four lines CCD sensor in which the first line CCD sensor for reading the draft as the black-and-white image, and the second, third, and fourth line CCD sensors for reading the draft as the color image are contained in the same package.

* * * * *